United States Patent
Hara et al.

(10) Patent No.: US 11,407,407 B2
(45) Date of Patent: Aug. 9, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yuki Hara, Wako (JP); Yasushi Shoda, Wako (JP); Junpei Noguchi, Wako (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 16/795,639

(22) Filed: Feb. 20, 2020

(65) Prior Publication Data
US 2020/0269835 A1    Aug. 27, 2020

(30) Foreign Application Priority Data

Feb. 27, 2019   (JP) .............................. JP2019-034304

(51) Int. Cl.
*B60W 30/06*   (2006.01)
*B60W 10/04*   (2006.01)
(Continued)

(52) U.S. Cl.
CPC ............. *B60W 30/06* (2013.01); *B60L 53/36* (2019.02); *B60S 5/02* (2013.01); *B60W 10/04* (2013.01);
(Continued)

(58) Field of Classification Search
CPC ...... B60W 30/06; B60W 10/04; B60W 10/20; B60W 2510/244; B60W 2530/209;
(Continued)

(56) References Cited

U.S. PATENT DOCUMENTS

2012/0253568 A1*  10/2012  Uyeki ..................... B60L 53/65
                                                  701/22
2014/0089016 A1*  3/2014  Smullin ................. G06Q 10/02
                                                  705/5
(Continued)

FOREIGN PATENT DOCUMENTS

JP    2011-218863    11/2011
JP    2014-095957    5/2014
(Continued)

OTHER PUBLICATIONS

Japanese Notice of Allowance for Japanese Patent Application No. 2019-034304 dated Apr. 5, 2022.

*Primary Examiner* — Jonathan M Dager
*Assistant Examiner* — Jean W Charleston
(74) *Attorney, Agent, or Firm* — Amin, Turocy & Watson, LLP

(57) ABSTRACT

According to an embodiment, there is provided a vehicle control device including a recognizer configured to recognize a surrounding environment of a vehicle, a driving controller configured to perform driving control based on speed control and steering control of the vehicle on the basis of a recognition result, and an acquirer configured to acquire the remaining amount of energy of the vehicle, wherein the driving controller causes the vehicle to move from a first parking area to a second parking area where parking is possible according to traveling based on the driving control and traveling based on manual driving in a state in which the vehicle is parked or has been parked in the first parking area where the vehicle is parked according to the traveling based on the driving control and when the remaining amount of energy acquired is less than or equal to a threshold value.

6 Claims, 10 Drawing Sheets

(51) Int. Cl.
*B60W 10/20* (2006.01)
*G07C 5/00* (2006.01)
*B60L 53/36* (2019.01)
*B60S 5/02* (2006.01)

(52) U.S. Cl.
CPC ............. *B60W 10/20* (2013.01); *G07C 5/004* (2013.01); *B60W 2510/244* (2013.01); *B60W 2530/209* (2020.02); *B60W 2710/20* (2013.01); *B60W 2720/10* (2013.01)

(58) Field of Classification Search
CPC ......... B60W 2710/20; B60W 2720/10; B60W 30/18009; B60W 40/00; B60W 40/02; B60W 50/14; B60W 2050/146; B60L 53/36; B60L 53/12; B60L 53/67; B60L 2250/16; B60L 58/13; B60L 2260/32; B60S 5/02; G07C 5/004; G06K 9/00812; G06K 9/00798; G06K 9/00805; Y02T 10/7072; Y02T 90/14; Y02T 10/70; Y02T 90/12; G08G 1/005; G08G 1/143; G08G 1/144; H04W 4/48

USPC .......................................................... 701/23
See application file for complete search history.

(56) References Cited

U.S. PATENT DOCUMENTS

| | | | |
|---|---|---|---|
| 2015/0225017 A1* | 8/2015 | Takeda | B62D 6/008 701/41 |
| 2015/0348335 A1* | 12/2015 | Ramanujam | G06Q 10/00 701/23 |
| 2016/0082978 A1* | 3/2016 | Ozaki | B60W 50/14 701/58 |
| 2017/0313321 A1* | 11/2017 | Asakura | B60W 30/18 |
| 2018/0281612 A1* | 10/2018 | Perry | B60L 53/63 |
| 2018/0286238 A1* | 10/2018 | Linder | G08G 1/0133 |
| 2019/0202442 A1* | 7/2019 | Lavoie | H04W 4/023 |
| 2019/0226861 A1* | 7/2019 | Schimik | B60W 50/0097 |
| 2020/0198658 A1* | 6/2020 | Suzuki | B60R 16/02 |

FOREIGN PATENT DOCUMENTS

| | | |
|---|---|---|
| JP | 2019-023585 | 2/2019 |
| JP | 2016-095749 | 5/2019 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-034304, filed Feb. 27, 2019, the content of which is incorporated herein by reference.

BACKGROUND

Field of the Invention

The present invention relates to a vehicle control device, a vehicle control method, and a storage medium.

Description of Related Art

A vehicle charging management system for managing the use of a parking space for charging and a charging device using a parking ticket with a regular information code is known (for example, Japanese Unexamined Patent Application, First Publication No. 2014-95957).

SUMMARY

Incidentally, in recent years, research on self-traveling parking in which a vehicle is automatically controlled to allow the vehicle to enter or leave a parking lot without depending on an occupant's operation has been conducted. However, if the remaining amount of energy of the vehicle is insufficient, there is a possibility that self-traveling parking cannot be executed. Thus, when a vehicle has entered a parking lot where entry of people is prohibited, it may be difficult for the vehicle to leave the parking lot.

An aspect of the present invention has been made in consideration of such circumstances and an objective of the present invention is to provide a vehicle control device, a vehicle control method, and a storage medium capable of executing more appropriate self-traveling parking.

A vehicle control device, a vehicle control method, and a storage medium according to aspects of the present invention adopt the following configurations.

(1): According to an aspect of the present invention, there is provided a vehicle control device including: a recognizer configured to recognize a surrounding environment of a vehicle; a driving controller configured to perform driving control based on speed control and steering control of the vehicle on the basis of a recognition result of the recognizer; and an acquirer configured to acquire the remaining amount of energy of the vehicle, wherein the driving controller causes the vehicle to move from a first parking area to a second parking area where parking is possible according to traveling based on the driving control and traveling based on manual driving in a state in which the vehicle is parked or has been parked in the first parking area where the vehicle is parked according to the traveling based on the driving control and when the remaining amount of energy acquired by the acquirer is less than or equal to a threshold value.

(2): In the above-described aspect (1), the vehicle control device further includes a communicator configured to communicate with a terminal device; and a notification controller configured to cause the communicator to notify the terminal device of the occupant of the vehicle that the remaining amount of energy is less than or equal to the threshold value when movement of the vehicle from the first parking area to the second parking area according to the traveling based on the driving control has been completed.

(3): In the above-described aspect (2), the vehicle control device further includes an energy storage device configured to supply energy for travel driving of the vehicle, wherein the acquirer acquires the remaining amount of energy of the energy storage device, the notification controller inquires of the terminal device about whether to supply the energy to the energy storage device in a supply area when the remaining amount of energy is less than or equal to the threshold value and there is a supply area where the supply of the energy for the energy storage device is possible in an area other than the first parking area in the state in which the vehicle is parked or has been parked in the first parking area, and the driving controller causes the vehicle to move to the supply area when an instruction for supplying the energy for the energy storage device has been received from the terminal device.

(4): In the above-described aspect (3), the driving controller causes the vehicle to move from the supply area to the first parking area after the supply is completed when the energy is supplied to the energy storage device in a non-contact scheme in the supply area.

(5): In the above-described aspect (3), the notification controller causes the communicator to notify the terminal device of information about a request for allowing the occupant to move to a position of the vehicle when the energy is supplied to the energy storage device in a contact scheme in the supply area.

(6): In the above-described aspect (5), the driving controller causes the vehicle to move from the supply area to the second parking area when the supply of the energy for the energy storage device has not started even when a period of time from the arrival of the vehicle at the supply area or a period of time from the notification of the information about the request to the terminal device exceeds a time limit.

(7): According to an aspect of the present invention, there is provided a vehicle control method including: recognizing, by a computer, a surrounding environment of a vehicle; performing, by the computer, driving control based on speed control and steering control of the vehicle on the basis of a recognition result; acquiring, by the computer, the remaining amount of energy of the vehicle; and causing, by the computer, the vehicle to move from a first parking area to a second parking area where parking is possible according to traveling based on the driving control and traveling based on manual driving in a state in which the vehicle is parked or has been parked in the first parking area where the vehicle is parked according to the traveling based on the driving control and when the acquired remaining amount of energy is less than or equal to a threshold value.

(8): According to an aspect of the present invention, there is provided a computer-readable non-transitory storage medium storing a program for causing a computer to: recognize a surrounding environment of a vehicle; perform driving control based on speed control and steering control of the vehicle on the basis of a recognition result; acquire the remaining amount of energy of the vehicle; and cause the vehicle to move from a first parking area to a second parking area where parking is possible according to traveling based on the driving control and traveling based on manual driving in a state in which the vehicle is parked or has been parked in the first parking area where the vehicle is parked according to the traveling based on the driving control and when the acquired remaining amount of energy is less than or equal to a threshold value.

According to the aspects (1) to (8), it is possible to implement more appropriate self-traveling parking.

DESCRIPTION OF EMBODIMENTS

Hereinafter, embodiments of a vehicle control device, a vehicle control method, and a storage medium according to the present invention will be described with reference to the drawings. Hereinafter, an embodiment in which the vehicle control device is applied to an automated driving vehicle will be described as an example. In automated driving, for example, driving control is performed by automatically controlling one or both of steering and acceleration/deceleration of the vehicle. The driving control may be performed on the automated driving vehicle according to a manual operation of an occupant.

[Overall Configuration]

Figure 1:
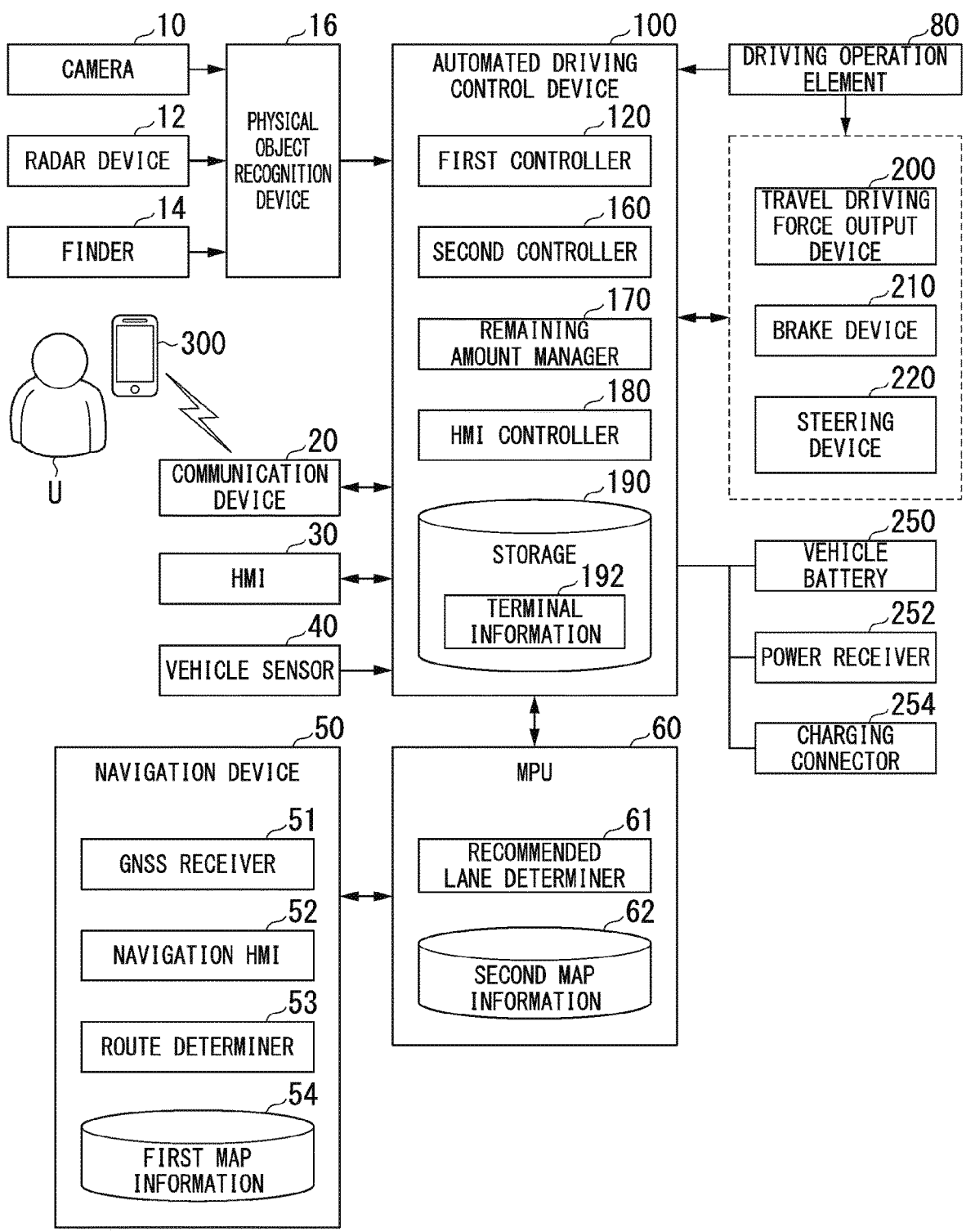
FIG. 1 is a configuration diagram of a vehicle system using a vehicle control device according to an embodiment.

FIG. 1 is a configuration diagram of a vehicle system 1 using a vehicle control device according to an embodiment. For example, a vehicle on which the vehicle system 1 is mounted is, for example, a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power from an electric power generator connected to the internal combustion engine or discharge electric power of a vehicle battery (an example of an energy storage device) such as a secondary battery or a fuel cell. In the following, the "remaining amount of energy" mainly indicates the remaining amount of battery power of the vehicle battery, but is not limited thereto in the present embodiment. For example, when the energy storage device is a storage device configured to store energy of liquid fuel such as gasoline, gaseous fuel such as hydrogen, or the like, the remaining amount of energy is the remaining amount of liquid fuel or gaseous fuel. "Charging for the vehicle battery" is an example of "supply of energy for the energy storage device".

For example, the vehicle system 1 includes a camera 10, a radar device 12, a finder 14, a physical object recognition device 16, a communication device 20, a human machine interface (HMI) 30, a vehicle sensor 40, a navigation device 50, a map positioning unit (MPU) 60, a driving operation element 80, an automated driving control device 100, a travel driving force output device 200, a brake device 210, a steering device 220, a vehicle battery 250, a power receiver 252, and a charging connector 254. Such devices and equipment are connected to each other by a multiplex communication line such as a controller area network (CAN) communication line, a serial communication line, or a wireless communication network. The configuration shown in FIG. 1 is merely an example, a part of the configuration may be omitted, and another configuration may be further added. A combination of the communication device 20, the automated driving control device 100, the vehicle battery 250, the power receiver 252, and the charging connector 254 is an example of a "driving control device". The communication device 20 is an example of a "communicator". The automated driving control device 100 is an example of a "driving controller". A remaining amount manager 170 is an example of an "acquirer". An HMI controller 180 is an example of a "notification controller".

For example, the camera 10 is a digital camera using a solid-state imaging element such as a charge coupled device (CCD) or a complementary metal oxide semiconductor (CMOS). The camera 10 is attached to any position on the vehicle (hereinafter, a vehicle M) on which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any position on the vehicle M. The radar device 12 may detect a position and speed of the physical object in a frequency modulated continuous wave (FM-CW) scheme.

The finder 14 is a light detection and ranging (LIDAR) finder. The finder 14 radiates light to the vicinity of the vehicle M and measures scattered light. The finder 14 detects a distance to an object on the basis of time from light emission to light reception. The radiated light is, for example, pulsed laser light. The finder 14 is attached to any position on the vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving control device 100. The physical object recognition device 16 may output detection results of the camera 10, the radar device 12, and the finder 14 to the automated driving control device 100 as they are. The physical object recognition device 16 may be omitted from the vehicle system 1.

The communication device 20 communicates with the terminal device 300 used by an occupant U of the vehicle M, another vehicle present in the vicinity of the vehicle M, a parking lot management device (to be described below), or various types of server devices using, for example, a cellular network or a Wi-Fi network, Bluetooth (registered trademark), dedicated short range communication (DSRC), or the like. The terminal device 300 is, for example, a portable terminal such as a smartphone or a tablet terminal possessed by the occupant U.

The HMI 30 presents various types of information to an occupant of the vehicle M and receives an input operation of the occupant. The HMI 30 includes various types of display devices, a speaker, a buzzer, a touch panel, a switch, keys, and the like. The display device includes, for example, a meter display provided in a portion of an instrument panel facing a driver, a center display provided at the center of the instrument panel, a head up display (HUD), and the like. For example, the HUD is a device that allows the occupant to visually recognize an image by superimposing the image on a landscape. As an example, the HUD projects light including an image on a front windshield or a combiner of the vehicle M, thereby allowing the occupant to visually recognize a virtual image.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like. The vehicle sensor 40 may include a charging detection sensor configured to detect that the vehicle battery 250 is being charged (the start or end of charging) or a power detection sensor configured to detect that power is being received by the power receiver 252 and a connection detection sensor configured to detect a connection state between the charging connector 254 and the charging plug on the charging facility side. A result detected by the vehicle sensor 40 is output to the automated driving control device 100.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the vehicle M on the basis of a signal received from a GNSS satellite. The position of the vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device 300 of the occupant U. The navigation device 50 may transmit a current position and a destination to a navigation server via the communication device 20 and acquire a route equivalent to the route on the map from the navigation server. The navigation device 50 outputs the determined route on the map to the MPU 60.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] with respect to a traveling direction of the vehicle), and determines a recommended lane for each block with reference to the second map information 62. The recommended lane determiner 61 determines what number lane the vehicle travels in from the left. The recommended lane determiner 61 determines the recommended lane so that the vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/zip code), facility information, parking area information, information about a charging area (an example of a "supply area where energy is supplied") (hereinafter, charging area information), telephone number information, and the like. The parking area information includes, for example, a position and a shape of the parking area, the number of vehicles that can be parked, the availability of manned traveling, the availability of unmanned traveling, and the like. The charging area information is, for example, position information, charging facility details (for example, a charging scheme), the number of devices capable of performing charging, and the like. The second map information 62 may be updated at any time when the communication device 20 communicates with another device.

For example, the driving operation element 80 includes an accelerator pedal, a brake pedal, a shift lever, a steering wheel, a steering wheel variant, a joystick, and other operation elements. A sensor configured to detect an amount of operation or the presence or absence of an operation is attached to the driving operation element 80, and a detection result thereof is output to the automated driving control device 100 or some or all of the travel driving force output device 200, the brake device 210, and the steering device 220.

The automated driving control device 100 includes, for example, a first controller 120, a second controller 160, the remaining amount manager 170, the HMI controller 180, and a storage 190. The first controller 120, the second controller 160, the remaining amount manager 170, and the HMI controller 180 are implemented, for example, by a hardware processor such as a central processing unit (CPU) executing a program (software). Some or all of these components are implemented, for example, by hardware (a circuit including circuitry) such as large scale integration (LSI), an application specific integrated circuit (ASIC), a field-programmable gate array (FPGA), or a graphics processing unit (GPU) or may be implemented by cooperation between software and hardware. The program may be pre-stored in a storage device such as an HDD or a flash memory of the automated driving control device 100 (a storage device including a non-transitory storage medium) or may be installed in the HDD or the flash memory of the automated driving control device 100 when the program is stored in a removable storage medium such as a DVD or a CD-ROM and the storage medium (the non-transitory storage medium) is mounted on a drive device.

Figure 2:
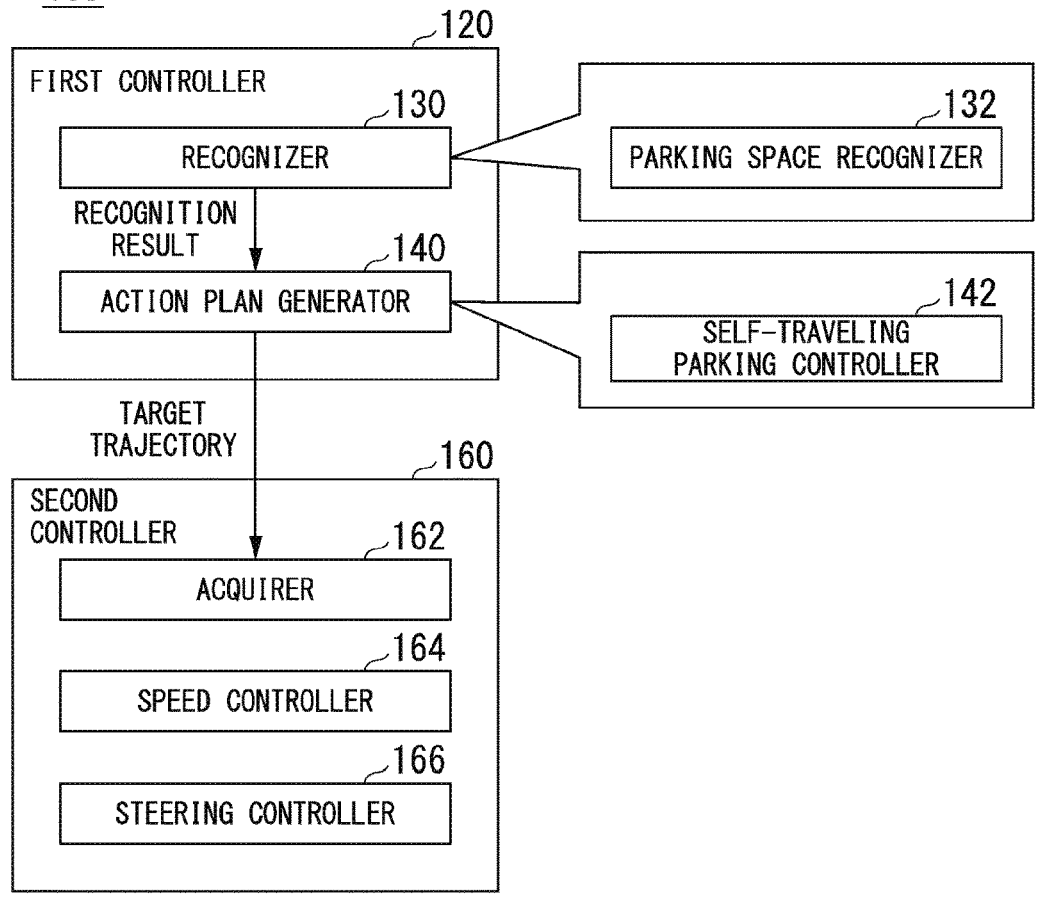
FIG. 2 is a functional configuration diagram of a first controller and a second controller.

FIG. 2 is a functional configuration diagram of the first controller 120 and the second controller 160. The first controller 120 includes, for example, a recognizer 130, and an action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured.

The recognizer 130 recognizes a surrounding environment of the vehicle M. The recognizer 130 recognizes a state such as a position, velocity, or acceleration of a physical object present in the vicinity of the vehicle M on the basis of information input from the camera 10, the radar device 12, and the finder 14 via the physical object recognition device 16. For example, the position of the physical object is recognized as a position on absolute coordinates with a representative point (a center of gravity, a driving shaft center, or the like) of the vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 130 recognizes a lane in which the vehicle M is traveling (a travel lane). For example, the recognizer 130 recognizes the travel lane by comparing a pattern of a road dividing line (for example, an arrangement of solid lines and broken lines) obtained from the second map information 62 with a pattern of road dividing lines in the vicinity of the vehicle M recognized from an image captured by the camera 10. The recognizer 130 may recognize a travel lane by recognizing a traveling path boundary (a road boundary) including a road dividing line, a road shoulder, a curb stone, a median strip, a guardrail, or the like as well as a road dividing line. In this recognition, a position of the vehicle M acquired from the navigation device 50 or a processing result of the INS may be added. The recognizer 130 recognizes a temporary stop line, an obstacle, red traffic light, a toll gate, an entrance/exit gate of a parking area, a charging area, and other road events.

When the travel lane is recognized, the recognizer 130 recognizes a position or orientation of the vehicle M with respect to the travel lane. For example, the recognizer 130 may recognize a gap of a reference point of the vehicle M from the center of the lane and an angle formed with respect to a line connecting the center of the lane in the travel direction of the vehicle M as a relative position and orientation of the vehicle M related to the travel lane. Alternatively, the recognizer 130 may recognize a position of the reference point of the vehicle M related to one side end portion (a road dividing line or a road boundary) of the travel lane or the like as a relative position of the vehicle M related to the travel lane.

The recognizer 130 includes a parking space recognizer 132 that is activated in a self-traveling parking event to be described below. Details of the function of the parking space recognizer 132 will be described below.

The action plan generator 140 generates a future target trajectory along which the vehicle M automatically travels (independently of a driver's operation) so that the vehicle M can generally travel in the recommended lane determined by the recommended lane determiner 61 and further cope with a surrounding situation of the vehicle M. For example, the target trajectory includes a speed element. For example, the target trajectory is represented by sequentially arranging points (trajectory points) at which the vehicle M is required to arrive. The trajectory point is a point where the vehicle M is required to reach for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the vehicle M is required to arrive at the sampling time for each prescribed sampling time. In this case, information about the target speed or the target acceleration is represented by an interval between the trajectory points.

The action plan generator 140 may set an automated driving event when the target trajectory is generated. The automated driving event includes a constant-speed traveling event, a low-speed following traveling event, a lane change event, a branching event, a merging event, a takeover event, a self-traveling parking event for parking the vehicle according to automated traveling (automated driving) in a valet parking or the like, and the like. For example, the automated traveling is traveling of the vehicle M according to the automated driving. The action plan generator 140 generates a target trajectory according to the activated event. For example, the action plan generator 140 includes a self-traveling parking controller 142 that is activated when the self-traveling parking event is executed. Details of the function of the self-traveling parking controller 142 will be described below.

The second controller 160 controls the travel driving force output device 200, the brake device 210, and the steering device 220 so that the vehicle M passes through the target trajectory generated by the action plan generator 140 at a scheduled time.

The second controller 160 includes, for example, an acquirer 162, a speed controller 164, and a steering controller 166. The acquirer 162 acquires information of a target trajectory (a trajectory point) generated by the action plan generator 140 and causes the acquired information to be stored in a memory (not shown). The speed controller 164 controls the travel driving force output device 200 or the brake device 210 on the basis of speed elements associated with the target trajectory stored in the memory. The steering controller 166 controls the steering device 220 in accordance with a degree of curve of a target trajectory stored in the memory. For example, processes of the speed controller 164 and the steering controller 166 are implemented by a combination of feed-forward control and feedback control. As one example, the steering controller 166 executes feedforward control according to the curvature of the road in front of the vehicle M and feedback control based on a deviation from the target trajectory in combination.

Returning to FIG. 1, the remaining amount manager 170 ascertains the state of the vehicle battery 250 and monitors the input/output of electric power to/from the vehicle battery 250. For example, the remaining amount manager 170 acquires the remaining amount of energy of the vehicle battery 250. Specifically, for example, the remaining amount manager 170 measures a terminal voltage of the vehicle battery 250 and acquires the remaining amount of energy on the basis of a magnitude of the measured terminal voltage. The remaining amount manager 170 may acquire the remaining amount of energy by, for example, totaling an amount of electric current stored during charging using a current detection resistor and obtaining an amount of electric current output during discharging. For example, the remaining amount manager 170 may pre-store a database of discharging characteristics, temperature characteristics, and the like of the vehicle battery 250 in the storage 190 or the like and acquire the remaining amount of energy on the basis of a measured voltage or current value and the database. The remaining amount manager 170 may cause some or all of the acquisition methods described above to be combined. The remaining amount manager 170 may acquire the above-described remaining amount of energy as a ratio with respect to the remaining amount of energy at the time of full power (for example, a state of charge (SoC)). The remaining amount manager 170 may perform cooling management of the vehicle battery 250, monitoring of a high-voltage safety circuit (not shown), or the like.

The HMI controller 180 notifies the occupant of prescribed information by means of the HMI 30. The prescribed information is, for example, information about the remaining amount of energy of the vehicle M. The prescribed information may include information related to traveling of the vehicle M such as information about the state of the vehicle M and information about driving control. The information about the state of the vehicle M includes, for example, a speed of the vehicle M, an engine speed, a shift position, and the like. The information about the driving control includes, for example, information about whether or not automated driving is to be executed, information about a degree of driving assistance based on automated driving, and the like. The prescribed information may include information that is not related to the traveling of the vehicle M, such as content (for example, a movie) stored in a storage medium such as a TV program or a DVD. The HMI controller 180 may output information received by the HMI 30 to the communication device 20, the navigation device 50, the first controller 120, and the like.

The HMI controller 180 may communicate with the terminal device 300 on the basis of the address information stored in the terminal information 192 via the communication device 20 and cause the HMI 30 to output information acquired from the terminal device 300. For example, the HMI controller 180 may perform control for causing the display device of the HMI 30 to display a registration screen for registering the terminal device 300 that communicates with the vehicle M and causing information about the terminal device (for example, address information) registered from the registration screen to be stored in the terminal information 192. The terminal device 300 that communicates with the vehicle M is, for example, a terminal device that instructs the vehicle M to enter and leave the parking area when the vehicle M automatically travels to enter and leave the parking area according to a self-traveling parking event. The above-described registration of the terminal device 300 is executed, for example, at a prescribed timing when the occupant gets into the vehicle or before the self-traveling parking is started. The above-described registration of the terminal device 300 may be performed by an application program (a vehicle cooperation application to be described below) installed in the terminal device 300.

The HMI controller 180 may transmit information obtained by the remaining amount manager 170, information about a driving state and a driving situation of the vehicle M, and inquiry information to the terminal device 300 and another external device via the communication device 20. The HMI controller 180 may output information (for example, instruction information) obtained from the terminal device 300 to the remaining amount manager 170.

The storage 190 is implemented by, for example, an HDD, a flash memory, an EEPROM, a read only memory (ROM), a random access memory (RAM), or the like. The storage 190 stores, for example, the terminal information 192 and other information. In the terminal information 192, for example, address information for communicating with the terminal device 300 is associated with a terminal ID that is identification information for identifying the terminal device 300. The terminal information 192 may include address information of a terminal device used by each of a plurality of occupants who get into the vehicle M. When there are a plurality of address information items, the HMI controller 180 may communicate with a terminal device 300 associated with one predetermined address information item or may communicate with a plurality of terminal devices 300 associated with the plurality of address information items.

The travel driving force output device 200 outputs a travel driving force (torque) for enabling the vehicle M to travel to driving wheels. For example, the travel driving force output device 200 may include a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operation element 80. When vehicle M travels using electric power supplied from vehicle battery 250, the travel driving force output device 200 may include a travel motor and a motor ECU. The motor ECU controls driving of the travel motor using electric power supplied from the vehicle battery 250. The motor ECU adjusts a duty ratio of a PWM signal given to the travel motor in accordance with information input from the second controller 160 or information input from the driving operation element 80 and outputs a travel driving force (torque) for enabling the vehicle M to travel by means of the travel motor. For example, the motor ECU may perform charging by returning electricity generated by forcibly turning the travel motor to the vehicle battery 250 when the wheels rotate after an accelerator is released.

The vehicle battery 250 supplies power for travel driving of the vehicle M and power for operating air conditioning and other equipment in the interior of the vehicle. For example, the vehicle battery 250 is a secondary battery such as a lithium ion battery. Any vehicle battery 250 may be used as long as it can be charged and discharged. For example, the vehicle battery 250 is charged and discharged under the control of the motor ECU included in the travel motor.

The power receiver 252 is used, for example, when the vehicle battery 250 is charged according to a non-contact scheme. The power receiver 252 receives power wirelessly in a charging area. The vehicle battery 250 is wirelessly charged by stopping the vehicle M at a position where the power receiver 252 can receive power without contact from a charging facility (for example, a power transmitter) provided in the charging area.

For example, the charging connector 254 is used when the vehicle battery 250 is charged according to a contact scheme. The charging connector 254 is a detachable connector that is connected to a charging plug of the charging facility in order to acquire power supplied from a charging facility installed in the charging area. For example, in the contact scheme, the vehicle battery 250 is charged in a state in which the charging connector 254 and the charging plug are connected (a contact state). Hereinafter, it is assumed that the charging connector 254 is attached to and detached from the charging plug by a person such as an occupant U. The vehicle system 1 according to the embodiment may have a configuration in which one of the power receiver 252 and the charging connector 254 is provided.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated by an operation of the brake pedal included in the driving operation element 80 to the cylinder via a master cylinder as a backup. Also, the brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor.

For example, the electric motor changes a direction of steerable wheels by applying a force to a rack and pinion mechanism. The steering ECU drives the electric motor in accordance with the information input from the second controller 160 or the information input from the driving operation element 80 to change the direction of the steerable wheels.

[Terminal Device 300]

Figure 3:
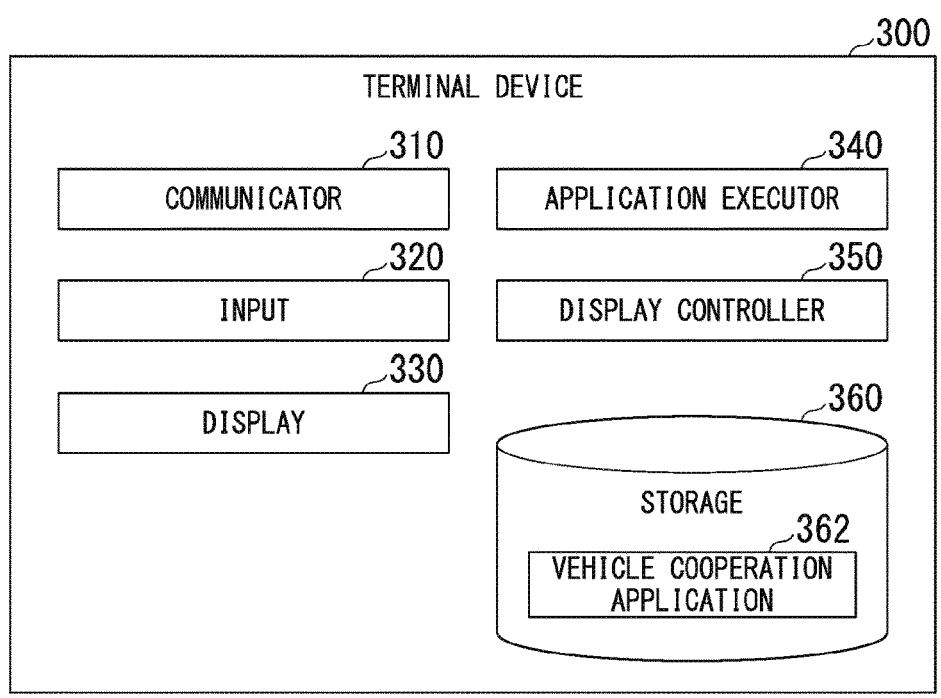
FIG. 3 is a diagram showing an example of a functional configuration of a terminal device.

FIG. 3 is a diagram showing an example of a functional configuration of the terminal device 300. The terminal device 300 includes, for example, a communicator 310, an input 320, a display 330, an application executor 340, a display controller 350, and a storage 360. The communicator 310, the input 320, the display 330, the application executor 340, and the display controller 350 are implemented, for example, by a hardware processor such as a CPU executing a program (software). Some or all of these components are implemented, for example, by hardware (a circuit including circuitry) such as LSI, an ASIC, an FPGA, or a GPU or may be implemented by cooperation between software and hardware. The above-described program may be pre-stored in a storage device such as an HDD or a flash memory provided in the terminal device 300 (a storage device including a non-transitory storage medium) or may be installed in the storage 360 when the program is stored in a removable storage medium such as a DVD or a CD-ROM and the storage medium (a non-transitory storage medium) is mounted on a drive device.

For example, the communicator 310 communicates with the vehicle M and other external devices via a network such as a local area network (LAN), a wide area network (WAN), or the Internet.

For example, the input 320 receives the input from a user (for example, the occupant U) by operating various types of keys and buttons and the like. The display 330 is, for example, a liquid crystal display (LCD) or the like. The input 320 may be configured integrally with the display 330 as a touch panel.

The application executor 340 is implemented by executing a vehicle cooperation application 362 stored in the storage 360. For example, the vehicle cooperation application 362 is an application program for communicating with the vehicle M via a network and transmitting an entering or leaving instruction in automated driving to the vehicle M. The vehicle cooperation application 362 may perform control for acquiring information transmitted by the vehicle M and causing the display 330 to display the information. The vehicle cooperation application 362 may receive a response to the inquiry about the charging of the vehicle battery 250 transmitted by the vehicle M and transmit received details (for example, instruction information) to the vehicle M. The vehicle cooperation application 362 may perform registration of the terminal device 300 and the occupant U in the vehicle M or other processing related to vehicle cooperation.

The display controller 350 controls details to be displayed on the display 330 and a display timing. For example, the display controller 350 generates an image for displaying information executed by the application executor 340 on the display 330 and causes the display 330 to display the generated image. The display controller 350 may generate a sound associated with some or all of the details to be displayed on the display 330 and output the generated sound from a speaker (not shown) of the terminal device. The display controller 350 may cause the display 330 to display an image received from the vehicle M or may cause the speaker to output a sound received from the vehicle M.

The storage 360 is implemented by, for example, an HDD, a flash memory, an EEPROM, a ROM, a RAM, or the like. For example, the vehicle cooperation application 362 and other information are stored in the storage 360.

Next, the automated driving control of the vehicle M according to the embodiment will be specifically described. Hereinafter, as an example of a scene in which automated driving control of the vehicle M is executed, a description will be given using a scene in which self-traveling parking is performed in valet parking at a visiting destination facility according to unmanned traveling.

Figure 4:
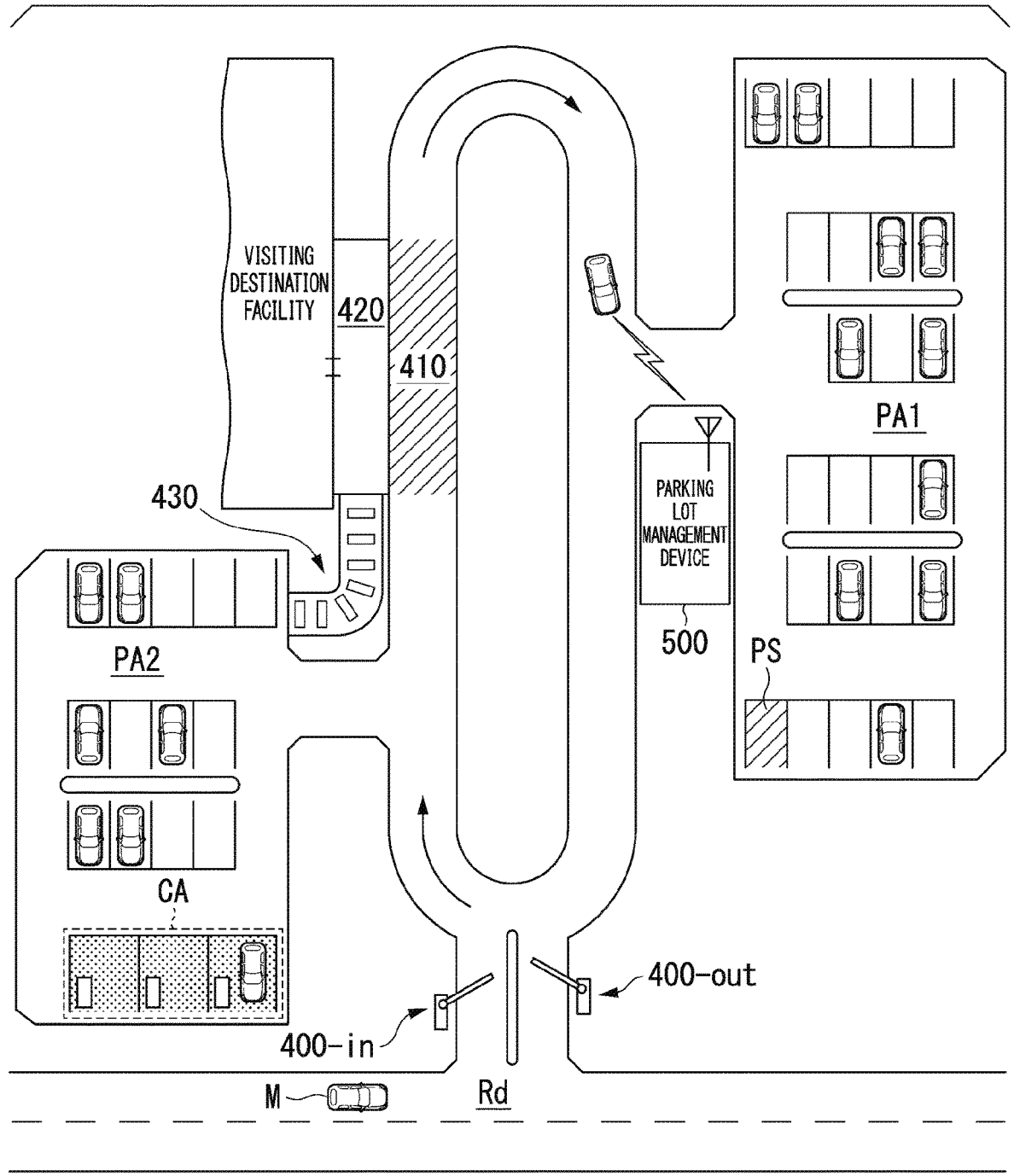
FIG. 4 is a diagram schematically showing a scene in which a self-traveling parking event is executed in the embodiment.

FIG. 4 is a diagram schematically showing a scene in which a self-traveling parking event is executed according to the embodiment. In the example of FIG. 4, the parking lot (for example, valet parking) of a visiting destination facility is shown. In the parking lot, it is assumed that gates 400-in and 400-out, a stop area 410, and a getting-into/out area 420 are provided on a route from a road Rd to the visiting destination facility. A first parking area PA1 and a second parking area PA2 are assumed to be provided in the parking lot.

The first parking area PA1 is, for example, an area where only a vehicle of unmanned traveling can travel and is basically an area where human entry is prohibited. The first parking area PA1 may be an area where parking is possible according to traveling based on automated driving. In this case, the first parking area PA1 includes, for example, an area where a person is prohibited from entering a part or all of the parking area or an area where there is a risk of entry of a person (for example, an area where a person is likely to interfere with movement of another vehicle within the parking area when he/she enters the parking area).

For example, the second parking area PA2 may be an area where the vehicle can travel according to unmanned traveling and manned traveling and is an area where the passage of the occupant of the vehicle is permitted. The second parking area PA2 may be an area where parking is possible according to traveling based on automated driving and manual driving. An occupant who has got out of the vehicle parked in the second parking area PA2 can move between the second parking area PA2 and the getting-into/out area 420 through a pedestrian crossing 430.

In the example of FIG. 4, a parking lot management device 500 configured to manage a parking situation and transmit an empty situation and the like to the vehicle is assumed to be provided in the first parking area PA1 and the second parking area PA2. In the example of FIG. 4, it is assumed that there is a charging area CA where the vehicle battery 250 can be charged in an area other than the first parking area PA1 (for example, a partial area of the second parking area PA2). The charging area CA is an example of a supply area where the supply of energy for the energy storage device is possible.

Here, processing at the time of entering and leaving in a self-traveling parking event will be described first. The processing at the time of entering and leaving is executed according to, for example, the reception of an entering instruction and a leaving instruction from the terminal device 300, the elapse of a preset time, or another execution start condition which is satisfied.

[Self-Traveling Parking Event-Entering Time]

For example, the self-traveling parking controller 142 causes the vehicle M to be parked within a parking space in the second parking area on the basis of information acquired from the parking lot management device 500 by means of the communication device 20. In this case, the vehicle M proceeds to the stop area 410 through the gate 400-in according to manual driving or automated driving. The stop area 410 faces the getting-into/out area 420 connected to a visiting destination facility. The getting-into/out area 420 is provided with eaves for avoiding rain and snow.

After the occupant gets out of the vehicle M in the stop area 410, the vehicle M performs unmanned automated driving and starts the self-traveling parking event in which the vehicle M moves to the parking space PS within the second parking area PA2. For example, a start trigger of the self-traveling parking event may be, for example, any operation of an occupant (for example, an entering start instruction from the terminal device 300) or may be the wireless reception of a prescribed signal from the parking lot management device 500. When a self-traveling parking event starts, the self-traveling parking controller 142 controls the communication device 20 so that the communication device 20 transmits a parking request to the parking lot management device 500. The vehicle M moves from the stop area 410 to the first parking area PA1 in accordance with guidance of the parking lot management device 500 or while performing sensing independently.

Figure 5:
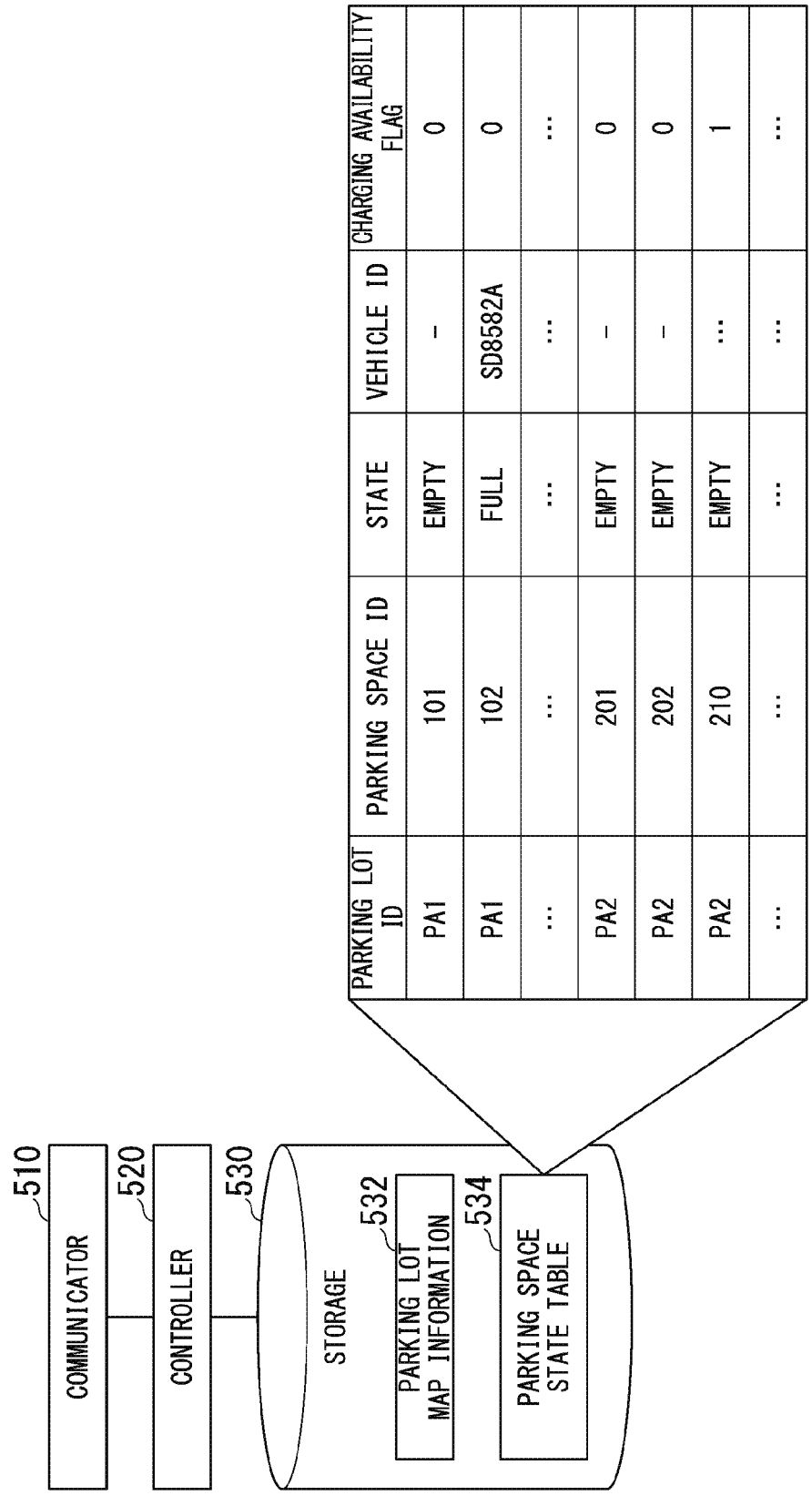
FIG. 5 is a diagram showing an example of a configuration of a parking lot management device.

FIG. 5 is a diagram showing an example of the configuration of the parking lot management device 500. The parking lot management device 500 includes, for example, a communicator 510, a controller 520, and a storage 530. The storage 530 stores information such as parking lot map information 532 and a parking space state table 534.

The communicator 510 wirelessly communicates with the vehicle M and other vehicles. The controller 520 guides the vehicle to the parking space PS on the basis of information acquired by the communicator 510 and information stored in storage 530. The parking lot map information 532 is information geometrically indicating structures of the first parking area PA1 and the second parking area PA2. The parking lot map information 532 includes coordinates for each parking space PS. In the parking space state table 534, for example, a state which is an empty state or a full (parked) state, a vehicle ID which is identification information of a vehicle during parking in the case of the full state, and a charging availability flag indicating whether or not charging of the vehicle battery in the parking space is possible are associated with a parking lot ID that is identification information for identifying a parking lot and a parking space ID that is identification information of the parking space PS. Although a flag for a parking space where charging is possible is set to "1" and a flag for a parking space where charging is not possible is set to "0" in the example of FIG. 5, other flags for identifying the availability of charging may be used. Regarding the charging availability flag, a flag for identifying the availability of charging in a non-contact scheme or a contact scheme may be stored.

When the communicator 510 receives a parking request from the vehicle, the controller 520 extracts the parking space PS whose state is the empty state with reference to the parking space state table 534, acquires a position of the extracted parking space PS from the parking lot map information 532, and transmits a suitable route to the acquired position of the parking space PS to the vehicle using the communicator 510. The controller 520 instructs a specific vehicle to stop or slow down as necessary so that vehicles do not move to the same position at the same time on the basis of positional relationships of a plurality of vehicles.

In the vehicle (hereinafter referred to as the vehicle M) receiving a route, the self-traveling parking controller 142 generates a target trajectory based on the route. When the vehicle M approaches the target parking space PS, the parking space recognizer 132 recognizes parking frame lines that divide off the parking space PS and the like, recognizes a detailed position of the parking space PS, and provides the recognized position to the self-traveling parking controller 142. The self-traveling parking controller 142 receives the provided position to correct the target trajectory and cause the vehicle M to be parked in the parking space PS.

[Self-Traveling Parking Event-Leaving Time]

The self-traveling parking controller 142 and the communication device 20 maintain the operation state even when the vehicle M has been parked. For example, the self-traveling parking controller 142 causes the system of the vehicle M to be activated and causes the vehicle M to move to the stop area 410 when the communication device 20 has received a pickup request (an example of a leaving instruction) from the terminal device 300 of the occupant U. At this time, the self-traveling parking controller 142 controls the communication device 20 so that the communication device 20 transmits a departure request to the parking lot management device 500. The controller 520 of the parking lot management device 500 instructs a specific vehicle to stop or slow down as necessary so that vehicles do not move to the same position at the same time on the basis of positional relationships of a plurality of vehicles, as in the case of the time of entering. When the vehicle M is moved to the stop area 410 and the occupant U is allowed to get into the vehicle M, the self-traveling parking controller 142 stops the operation and manual driving or automated driving by another functional part is started subsequently.

The self-traveling parking controller 142 may find an empty parking space by itself on the basis of the detection result of the camera 10, the radar device 12, the finder 14, or the physical object recognition device 16 independently of communication and cause the vehicle M to be parked in the found parking space without being limited to the above description.

Here, for example, if the remaining amount of energy of the vehicle battery 250 is insufficient during entering in the above-described self-traveling parking event, there is a possibility that entering and/or leaving based on unmanned traveling may not be completed. When an air conditioning facility or the like is operated using power of the vehicle battery 250 to adjust the temperature of the interior of the vehicle before the occupant gets into the vehicle M in a state in which the vehicle M has been parked in the first parking area PA1, there is a possibility that the remaining amount of energy may be insufficient and leaving based on the unmanned traveling may not be performed.

Therefore, the automated driving control device 100 in the embodiment causes the vehicle M to move from the first parking area PA1 to the second parking area PA2 in a state in which the vehicle M is parked or has been parked in the first parking area PA1 and when the remaining amount of energy of the vehicle battery 250 is less than or equal to the threshold value. The state in which the vehicle M is parked in the first parking area PA1 is, for example, a state in which the self-traveling parking event at the time of entering is being executed and includes, for example, a state from the time when the occupant U gets out of the vehicle M in the stop area 410 to the time when the vehicle M is parked in an empty space in the first parking area PA1. The threshold value is, for example, an amount of energy estimated to be necessary for moving the vehicle M from a current position to the second parking area PA2. In preparation for unexpected energy consumption, a threshold value obtained by adding a prescribed amount of energy (margin) to the estimated amount of energy may be used. The threshold value may be variably set on the basis of a size of the first parking area PA1, a parking position, the presence/absence of an air conditioning operation within the vehicle, and the like.

When the vehicle M is moved from the first parking area PA1 to the second parking area PA2, the remaining amount manager 170 outputs an instruction for causing the vehicle M to leave the first parking area PA1 and to be parked in an empty space in the second parking area PA2 to the first controller 120. The first controller 120 communicates with the parking lot management device 500, acquires the empty space in the second parking area PA2, and generates a target trajectory based on the self-traveling parking event for causing the vehicle M to be parked in the acquired empty space. The second controller 160 executes parking in the second parking area PA2 by causing the vehicle M to travel along the generated target trajectory. Thereby, when the vehicle M has been parked in an area to which the occupant U cannot move such as the first parking area PA1, the difficulty when the vehicle M leaves can be eliminated.

The HMI controller 180 generates information indicating that the remaining amount of energy is less than or equal to the threshold value when the movement of the vehicle M from the first parking area PA1 to the second parking area PA2 has been completed according to the above-described driving control. The HMI controller 180 provides a notification to an occupant by transmitting the generated information from the communication device 20 to the terminal device 300.

Figure 6:
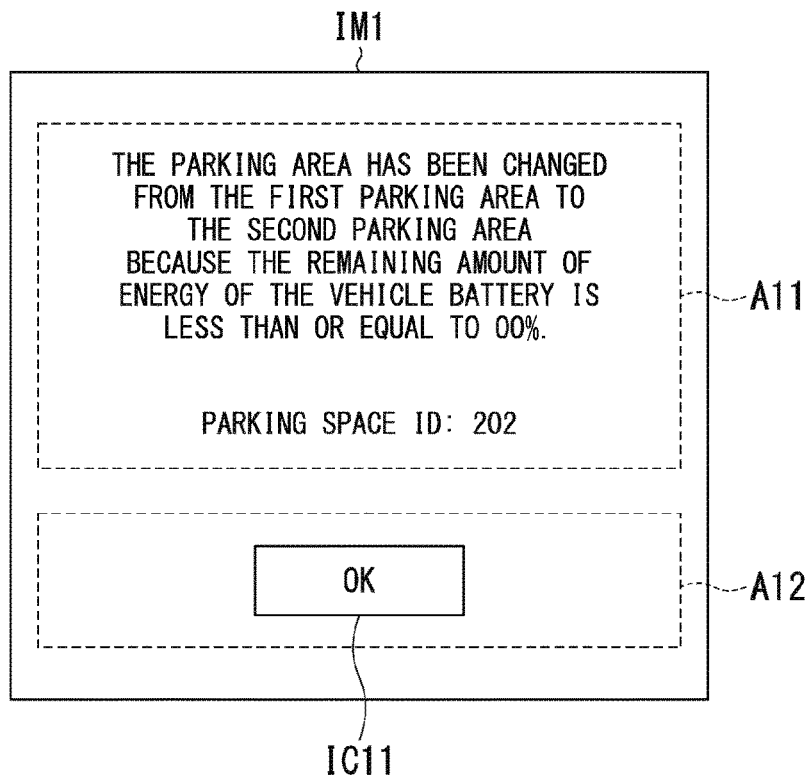
FIG. 6 is a diagram showing an example of an image including information indicating that the remaining amount of energy is less than or equal to a threshold value.

FIG. 6 is a diagram showing an example of an image IM1 including information indicating that the remaining amount of energy is less than or equal to a threshold value. The image IM1 is an image generated by the HMI controller 180 and displayed on the display 330 by the display controller 350 of the terminal device 300. The image IM1 may be generated by the display controller 350 on the basis of the information output by the HMI controller 180. The same applies to other images to be described below.

The image IM1 includes, for example, an information display area A11 and a graphical user interface (GUI) switch display area A12. In the information display area A11, for example, information indicating that the remaining amount of energy of the vehicle battery 250 is less than or equal to the threshold value and that the parking area has been changed because the remaining amount of energy is low is displayed. Information about a parking position after movement of the vehicle M (for example, a parking space ID) may be displayed in the information display area A11. In the information display area A11, the actual remaining amount of energy of the vehicle battery 250 may be displayed. In the example of FIG. 6, notification information of "The parking area has been changed from the first parking area to the second parking area because the remaining amount of energy of the vehicle battery is less than or equal to OO %." and "Parking space ID: 202" is displayed in the information display area A11.

In a GUI switch display area A12, for example, an icon IC11 that receives an instruction for ending the display of the image IM1 is displayed. In the example of FIG. 6, the icon IC11 on which the word "OK" is written is displayed in the GUI switch display area A12. The display controller 350 causes the display of the image IM1 to end when the selection of the icon IC11 has been received by the input 320.

In this manner, it is possible to allow the occupant U to accurately ascertain the movement of the vehicle M to the second parking area PA2 because the remaining amount of energy of the vehicle battery 250 is small and information about the parking position by causing the display 330 to display the image IM1. Therefore, even when the vehicle M is in a state in which leaving based on the self-traveling parking event is impossible due to a lack of energy, the occupant U can enter the second parking area PA2 and move to the parking position of the vehicle M. It is possible to reduce the burden of searching for the vehicle M of the occupant U by providing a notification of the parking position.

The HMI controller 180 may cause the display device of the HMI 30 to display the image IM1 when an occupant is present in the vehicle M. Thereby, for example, it is possible to allow an occupant (for example, a child) who cannot drive waiting in the interior of the vehicle or the like to ascertain the reason why the vehicle M has moved on the assumption that the occupant does not go outside the vehicle. When the image IM1 is displayed on the display device of the HMI 30, the HMI controller 180 causes the image IM1 to be displayed before the movement from the first parking area PA1 to the second parking area PA2 is started or at a timing when the movement from the first parking area PA1 to the second parking area PA2 is started. Thereby, it is possible to allow the occupant within the vehicle to ascertain the reason why the vehicle M moves in an early stage and give a sense of safety.

[Driving Control when there is Charging Area]

Next, driving control when there is a charging area will be described. For example, instead of (or in addition to) causing the image IM1 to be displayed by the HMI controller 180, the remaining amount manager 170 may generate an image for inquiring about whether or not the vehicle battery 250 is to be charged in the charging area and cause the generated image to be displayed on the terminal device 300 when the remaining amount of energy of the vehicle battery 250 is less than or equal to the threshold value and there is a charging area where the vehicle battery 250 can be charged in an area other than the first parking area PA1 in a state in which the vehicle M is parked or has been parked in the first parking area PA1. The area other than the first parking area PA1 is, for example, an area to which the vehicle M can travel with the current remaining amount of energy. For example, a charging area existing in an area other than the first parking area PA1 may be targeted to prevent the vehicle M from being unable to travel within the first parking area PA1 because the remaining amount of energy is insufficient while charging is on standby due to the congestion of the charging area of the first parking area PA1 or the like. This may be because the vehicle M cannot enter the charging area of the first parking area PA1 and the charging connector 254 and the charging plug cannot be connected when the vehicle M can be only charged in the contact scheme. In the following, the charging area CA existing in the second parking area PA2 is assumed to be within an area where the vehicle M can travel with the current remaining amount of energy.

<When Charging is Possible in Non-Contact Scheme>

Figure 7:
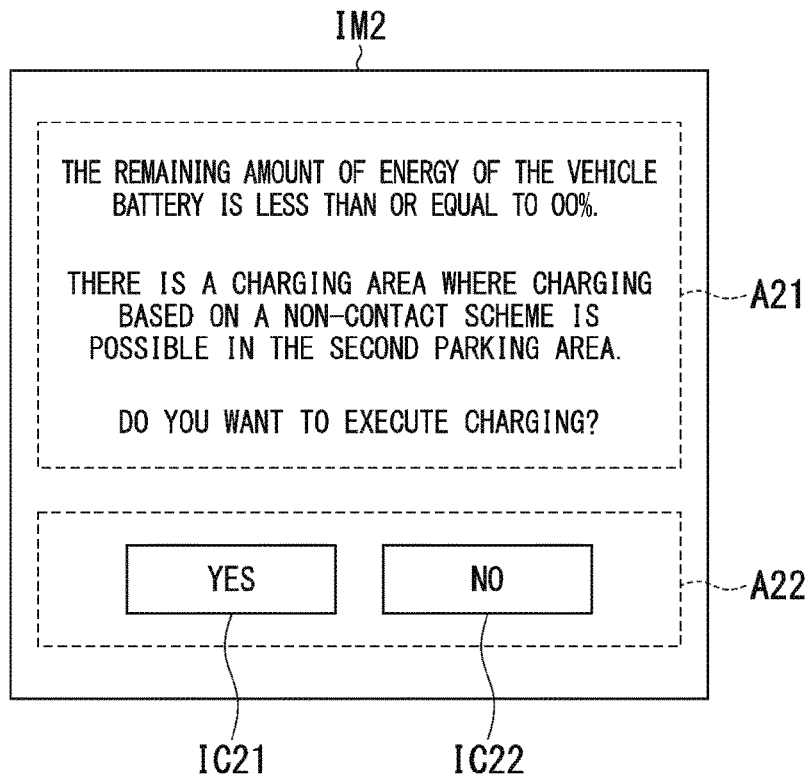
FIG. 7 is a diagram showing an example of an image for inquiring about whether or not charging of a vehicle battery is to be performed in a charging area.

FIG. 7 is a diagram showing an example of an image IM2 for inquiring about whether or not the vehicle battery 250 is to be charged in the charging area CA. In the example of FIG. 7, a scene of an inquiry about the necessity of charging based on the non-contact scheme is shown. The image IM2 includes, for example, an information display area A21 and a GUI switch display area A22. The information display area A21 includes, for example, information indicating that the remaining amount of energy of the vehicle battery 250 is less than or equal to the threshold value, information about a charging area, and information about an inquiry about whether or not charging based on a non-contact scheme is to be performed. In the example of FIG. 7, notification information of "The remaining amount of energy of the vehicle battery is less than or equal to OO %.", "There is a charging area where charging based on a non-contact scheme is possible in the second parking area.", and "Do you want to execute charging?" is displayed in the information display area A21.

The GUI switch display area A22 includes, for example, an icon IC21 that receives an instruction for executing charging and an icon IC22 that receives an instruction for preventing charging from being executed. The occupant U selects the icon IC21 when charging of the vehicle battery 250 based on the non-contact scheme is performed and selects the icon IC22 when charging is not executed. The display controller 350 transmits information of the instruction according to the selection of the icon IC21 or the icon IC22 by the occupant U to the vehicle M via the communicator 310.

The remaining amount manager 170 acquires the instruction information of the terminal device 300 received from the communication device 20 and moves the vehicle M on the basis of the acquired instruction information. For example, when the acquired instruction information is an instruction for preventing charging based on the non-contact scheme from being performed, the remaining amount manager 170 outputs an instruction for causing the vehicle M to leave the first parking area PA1 and move to the second parking area PA2 to the first controller 120. The first controller 120 communicates with the parking lot management device 500, acquires an empty space in the second parking area PA2, and generates a target trajectory based on the self-traveling parking event for causing the vehicle M to be parked in the acquired empty space. The second controller 160 executes parking in the second parking area PA2 by causing the vehicle M to travel along the generated target trajectory. After the parking is completed, for example, the HMI controller 180 generates an image IM1 and transmits the generated image IM1 to the terminal device 300 to provide a notification to the occupant U.

When the instruction information acquired from the terminal device 300 is an instruction for executing charging based on the non-contact scheme, the remaining amount manager 170 outputs an instruction for causing the vehicle M to leave the first parking area PA1 and move to an empty space in the charging area CA to the first controller 120. The first controller 120 communicates with the parking lot management device 500 on the basis of the charging execution instruction, acquires an empty space in the charging area CA where charging based on the non-contact scheme is possible, and generates a target trajectory based on the self-traveling parking event for causing the vehicle M to be parked in the acquired empty space. The second controller 160 executes parking in the charging area CA by causing the vehicle M to travel along the generated target trajectory.

When the parking in the charging area CA is completed, the remaining amount manager 170 starts charging of the vehicle battery 250 based on the non-contact scheme. For example, the remaining amount manager 170 performs charging until the remaining amount of energy of the vehicle battery 250 reaches a prescribed remaining amount. The prescribed remaining amount is, for example, the remaining amount of energy sufficient to execute entering and/or leaving based on the self-traveling parking event. The prescribed remaining amount may be a fixed value or a variable value. The variable value is set according to, for example, a location or a region of a visiting destination facility, a type of vehicle, fuel consumption, or the like.

The remaining amount manager 170 may output an instruction for moving the vehicle M from the second parking area PA2 to the first parking area PA1 to the first controller 120 after the charging of the vehicle battery 250 in the charging area CA is completed. In this case, the first controller 120 communicates with the parking lot management device 500, acquires an empty space in the first parking area PA1, and generates a target trajectory based on the self-traveling parking event for causing the vehicle M to be parked in the acquired empty space. The second controller 160 executes parking in the empty space in the first parking area PA1 by causing the vehicle M to travel along the generated target trajectory. Thereby, it is possible to prevent the vehicle M from occupying the charging area CA after charging.

When the movement from the charging area CA to the first parking area PA1 has been completed, the HMI controller 180 may generate information indicating the remaining amount of energy after charging and indicating that the vehicle M has been parked in the first parking area PA1 and notify the occupant U of the generated information by transmitting the generated information to the terminal device 300.

Figure 8:
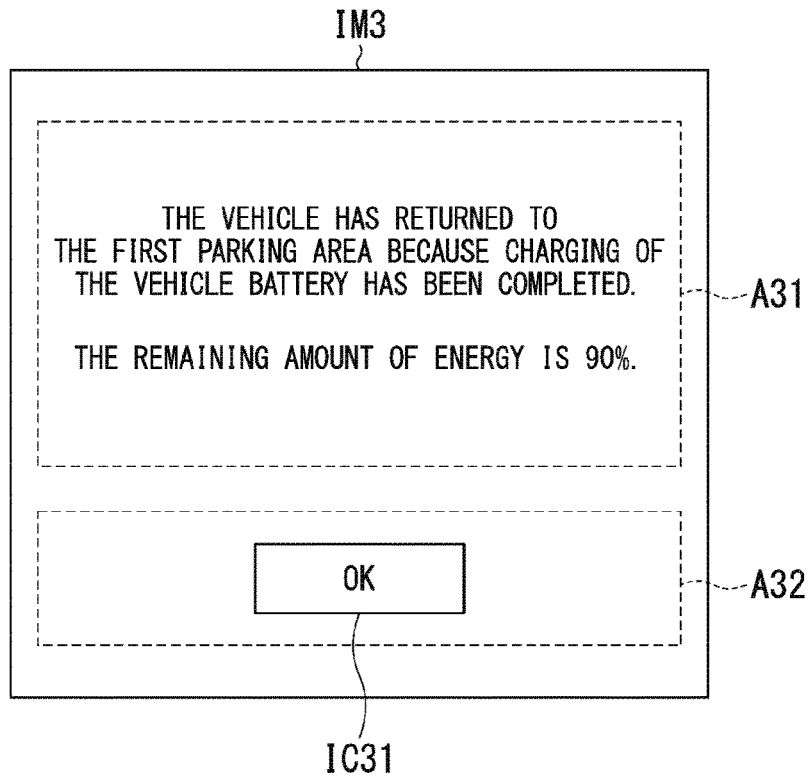
FIG. 8 is a diagram showing an example of an image displayed on the terminal device when charging is completed.

FIG. 8 is a diagram showing an example of an image IM3 displayed on the terminal device 300 when charging is completed. The image IM3 includes, for example, an information display area A31 and a GUI switch display area A32. In the information display area A31, for example, information indicating that the charging of the vehicle battery 250 has been completed and that the vehicle has returned to the first parking area and information about the remaining amount of energy are displayed. In the example of FIG. 8, notification information of "The vehicle has returned to the first parking area because charging of the vehicle battery has been completed." and "The remaining amount of energy is 90%." is displayed in the information display area A31.

In the GUI switch display area A32, for example, an icon IC31 that receives an instruction for ending the display of the image IM3 is displayed. In the example of FIG. 8, the icon IC31 on which the word "OK" is written is displayed in the GUI switch display area A32. The display controller 350 causes the display of the image IM3 to end when the selection of the icon IC31 has been received by the input 320.

When the vehicle battery 250 is being charged and a leaving instruction has been received from the occupant U in a state in which the remaining amount of energy has not reached the prescribed remaining amount, the HMI controller 180 may generate information about a charging situation and provide a notification to the occupant U by transmitting the generated information to the terminal device 300.

Figure 9:
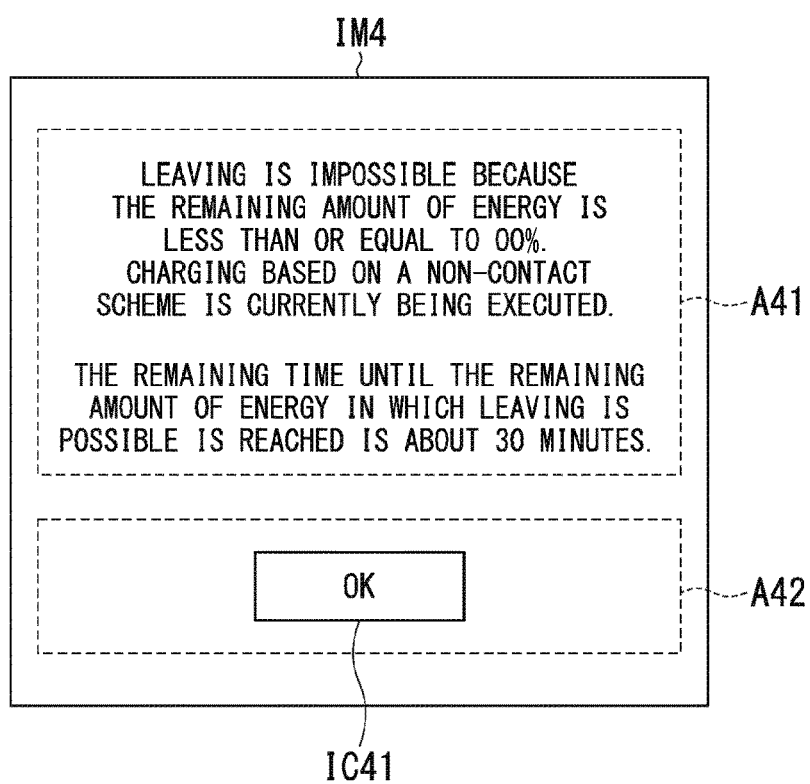
FIG. 9 is a diagram showing an example of an image showing a charging situation of the vehicle battery.

FIG. 9 is a diagram showing an example of an image IM4 indicating a charging situation of the vehicle battery 250. The image IM4 includes, for example, an information display area A41 and a GUI switch display area A42. In the information display area A41, for example, information indicating that leaving based on the automated driving cannot be performed because the remaining amount of energy is less than or equal to a threshold value and that charging is currently being performed, and information about the remaining time until leaving is possible are displayed. For example, the remaining time until charging is completed is estimated by the remaining amount manager 170 on the basis of various types of conditions. For example, the various types of conditions include an amount of power received by the power receiver 252, a surrounding environment (a temperature), a degree of deterioration of the vehicle battery 250, a change in charging up to now, or statistical information based on a previous charging history. In the example of FIG. 9, notification information of "Leaving is impossible because the remaining amount of energy is less than or equal to OO %.", "Charging based on a non-contact scheme is currently being executed.", and "The remaining time until the remaining amount of energy in which leaving is possible is reached is about 30 minutes." is displayed in the information display area A41. Thereby, when the leaving instruction has been received during charging, it is possible to allow the occupant U to accurately ascertain the reason why the vehicle M cannot leave and/or a period of time until leaving is possible.

In the GUI switch display area A42, for example, an icon IC41 that receives an instruction for ending the display of the image IM4 is displayed. In the example of FIG. 9, an icon IC41 on which the word "OK" is written is displayed in the GUI switch display area A42. The display controller 350 causes the display of the image IM4 to end when the selection of the icon IC41 has been received by the input 320.

<When Charging Based on Contact Scheme is Possible>

When the charging area CA in the embodiment is provided with a facility of a contact scheme and the vehicle M can be charged in the contact scheme, the HMI controller 180 may generate information for notifying the occupant of an inquiry about whether or not charging based on the contact scheme is to be performed and transmit the generated information to the terminal device 300 to provide a notification to the occupant U.

Figure 10:
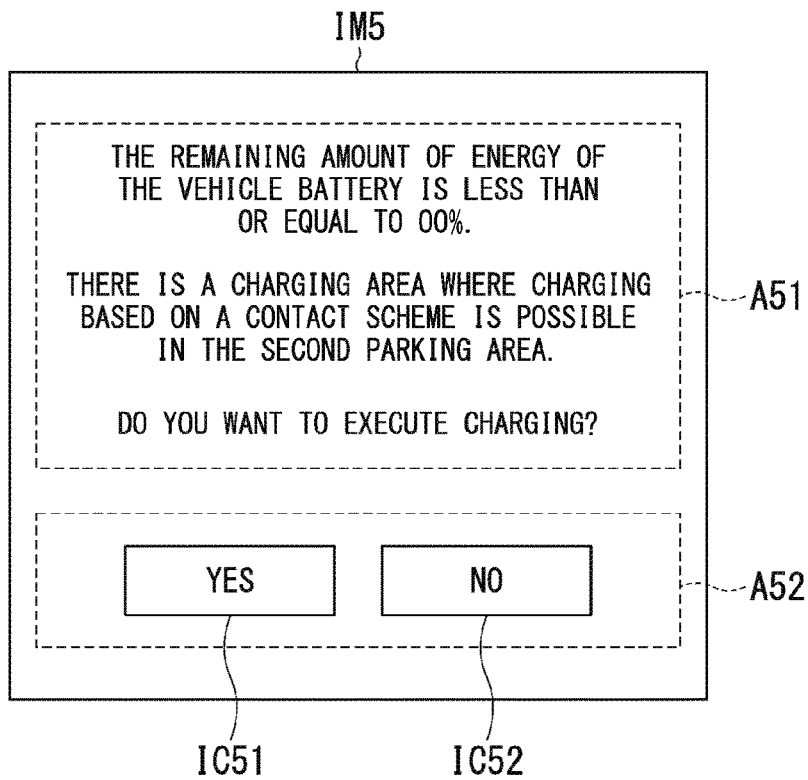
FIG. 10 is a diagram showing an example of an image for inquiring about whether or not the vehicle battery is to be charged in a contact scheme.

FIG. 10 is a diagram showing an example of an image IM5 for inquiring about whether or not the vehicle battery 250 is charged in a contact scheme. The image IM5 includes, for example, an information display area A51 and a GUI switch display area A52. The information display area A51 includes, for example, information indicating that the remaining amount of energy of the vehicle battery 250 is less than or equal to a threshold value, information about a charging area, and information about whether or not charging based on a contact scheme is to be performed. In the example of FIG. 10, notification information of "The remaining amount of energy of the vehicle battery is less than or equal to OO %.", "There is a charging area where charging based on a contact scheme is possible in the second parking area.", and "Do you want to execute charging?" is displayed in the information display area A51.

The GUI switch display area A52 includes, for example, an icon IC51 that receives an instruction for executing charging and an icon IC52 that receives an instruction for preventing charging from being executed. The occupant U selects the icon IC51 when charging of the vehicle battery 250 based on the contact scheme is performed and selects the icon IC52 when charging is not performed. The display controller 350 transmits instruction information according to the selection of the icon IC51 or the icon IC52 by the occupant U to the vehicle M via the communicator 310.

The remaining amount manager 170 acquires the instruction information of the terminal device 300 received from the communication device 20 and moves the vehicle M on the basis of the acquired instruction information. For example, when the acquired instruction information is an instruction for preventing charging based on the contact scheme from being performed, the remaining amount manager 170 outputs an instruction for causing the vehicle M to leave the first parking area PA1 and move to the second parking area PA2 to the first controller 120. The first controller 120 communicates with the parking lot management device 500, acquires an empty space in the second parking area PA2, and generates a target trajectory based on the self-traveling parking event for causing the vehicle M to be parked in the acquired empty space. The second controller 160 executes parking in the second parking area PA2 by causing the vehicle M to travel along the generated target trajectory. After the parking is completed, for example, the HMI controller 180 generates an image IM1 and transmits the generated image IM1 to the terminal device 300 to provide a notification to the occupant U.

When the instruction information acquired from the terminal device 300 is an instruction for executing charging based on the contact scheme, the remaining amount manager 170 outputs an instruction for causing the vehicle M to leave the first parking area PA1 and moves to an empty space in the charging area CA of the second parking area PA2 to the first controller 120. The first controller 120 communicates with the parking lot management device 500 on the basis of the charging execution instruction, acquires an empty space in the charging area CA where charging based on the contact scheme is possible, and generates a target trajectory based on the self-traveling parking event for causing the vehicle M to be parked in the acquired empty space. The second controller 160 executes parking in the charging area CA by causing the vehicle M to travel along the generated target trajectory.

The HMI controller 180 generates information about an empty space (a parking position) where the vehicle M is parked and information about a request for moving the occupant U to the parking position of the vehicle M in order to connect the charging connector 254 and the charging plug and transmits the generated information to the terminal device 300 to provide a notification to the occupant U.

Figure 11:
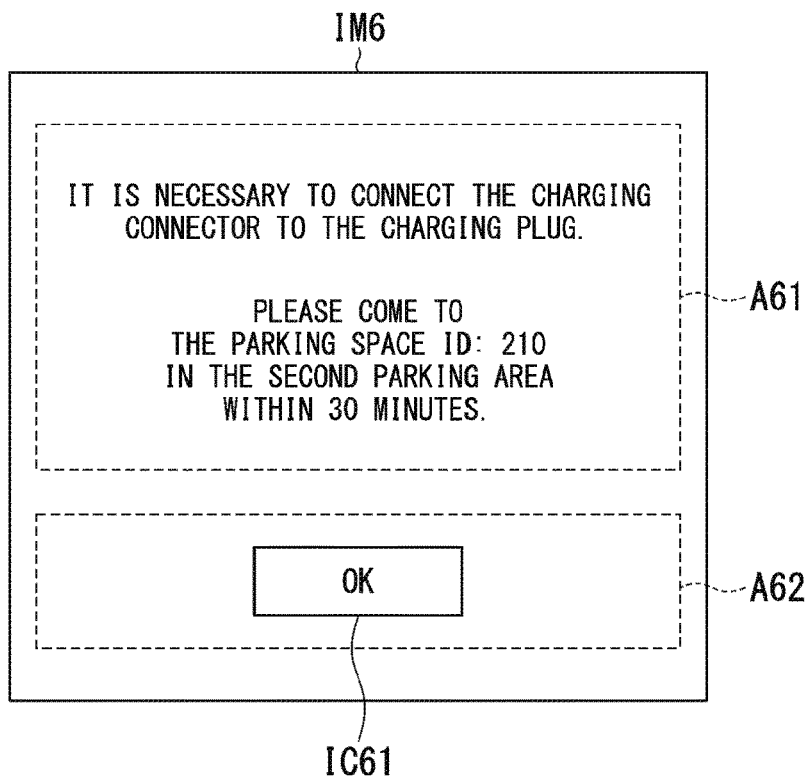
FIG. 11 is a diagram showing an example of an image for requesting an occupant to move to the vehicle in order to connect a charging connector and a charging plug.

FIG. 11 is a diagram showing an example of an image IM6 for requesting the occupant U to move to the vehicle M in order to connect the charging connector 254 and the charging plug. The image IM6 includes, for example, an information display area A61 and a GUI switch display area A62. In the information display area A61, for example, information about the reason why the occupant U moves to the vehicle M, a parking position, and a time limit is displayed. The time limit is, for example, a period of time until charging of the vehicle battery 250 is started. The time limit may be a period of time until the charging connector 254 and the charging plug are connected. The start time of the time limit may be, for example, the time when the vehicle M has arrived at the charging area CA or the time when the image IM6 has been displayed on the display 330 of the terminal device 300. In the example of FIG. 11, notification information of "It is necessary to connect the charging connector to the charging plug." and "Please come to the parking space ID: 210 in the second parking area within 30 minutes." is displayed in the information display area A61. Thereby, it is possible to allow the occupant U to accurately ascertain the reason why he/she returns to the vehicle M, a parking position, and a time limit.

In the GUI switch display area A62, for example, an icon IC61 that receives an instruction for ending the display of the image IM6 is displayed. In the example of FIG. 11, the icon IC61 on which the word "OK" is written is displayed in the GUI switch display area A62. When the selection of the icon IC61 is received by the input 320, the display controller 350 causes the display of the image IM6 to end.

Here, when charging of the vehicle battery 250 has not started even when the above-described time limit has elapsed, the remaining amount manager 170 outputs an instruction information to the first controller 120 so that the vehicle M leaves the charging area CA and is parked in an empty space in the second parking area PA2. The first controller 120 communicates with the parking lot management device 500 on the basis of the instruction information, acquires the empty space in the second parking area PA2, and generates a target trajectory based on the self-traveling parking event for causing the vehicle M to be parked in the acquired empty space. The second controller 160 executes parking in the empty space in the second parking area PA2 by causing the vehicle M to travel along the generated target trajectory. Thereby, it is possible to prevent the vehicle M from occupying the charging area CA in a state in which charging is not executed.

When the movement of the vehicle M from the charging area CA to the second parking area PA2 has been completed, the HMI controller 180 generates an image including information about the movement of the vehicle M, and transmits the generated image to the terminal device 300 to provide a notification to the occupant U.

Figure 12:
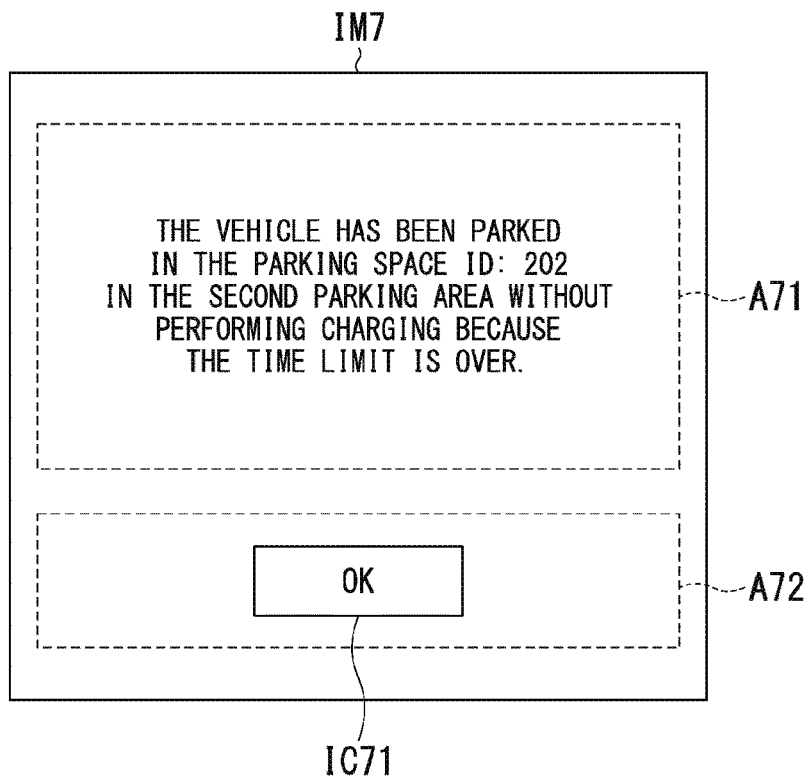
FIG. 12 is a diagram showing an example of an image indicating that the vehicle has moved from the charging area to a second parking area.

FIG. 12 is a diagram showing an example of an image IM7 indicating that the vehicle has moved from the charging area CA to the second parking area PA2. The image IM7 includes, for example, an information display area A71 and a GUI switch display area A72. In the information display area A71, for example, information about the reason why the vehicle M has moved without performing charging and a parking position is displayed. In the example of FIG. 12, notification information of "The vehicle has been parked in the parking space ID: 202 in the second parking area without performing charging because the time limit is over." is displayed the information display area A71. Thereby, it is possible to allow the occupant U to accurately ascertain the reason why the vehicle M has moved and/or the parking position.

In the GUI switch display area A72, for example, an icon IC71 for receiving an instruction for ending the display of the image IM7 is displayed. In the example of FIG. 12, the icon IC71 on which the word "OK" is written is displayed in the GUI switch display area A72. When the selection of the icon IC71 has been received by the input 320, the display controller 350 causes the display of the image IM7 to end.

When the charging of the vehicle battery 250 has been started before the above-described time limit elapses, the remaining amount manager 170 starts the charging of the vehicle battery 250. When the remaining amount of energy of the vehicle battery 250 has exceeded the prescribed remaining amount, the HMI controller 180 generates information about a request for moving the occupant U to the parking position of the vehicle M in order to remove the charging connector 254 from the charging plug and transmits the generated information to the terminal device 300 to provide a notification to the occupant U.

Figure 13:
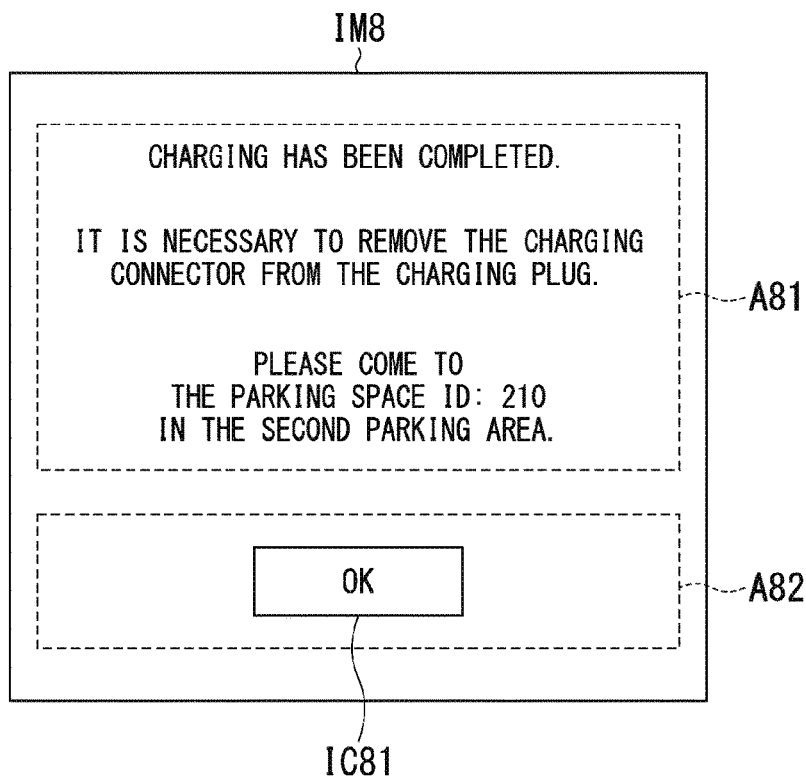
FIG. 13 is a diagram showing an example of an image for requesting the occupant to move to the vehicle M in order to remove the charging connector from the charging plug.

FIG. 13 is a diagram showing an example of an image IM8 for requesting the occupant U to move to the vehicle M in order to remove the charging connector 254 from the charging plug. The image IM8 includes, for example, an information display area A81 and a GUI switch display area A82. In the information display area A81, for example, information about the completion of charging of the vehicle M, the reason why the occupant U moves to the vehicle M, and a parking position is displayed when charging of the vehicle M has been completed. In the example of FIG. 13, notification information of "Charging has been completed.", "It is necessary to remove the charging connector from the charging plug.", and "Please come to the parking space ID: 210 in the second parking area." is displayed in the information display area A81. Thereby, it is possible to allow the occupant U to accurately ascertain the reason why the vehicle M moves to the parking position and a parking position.

In the GUI switch display area A82, for example, an icon IC81 that receives an instruction to end the display of the image IM8 is displayed. In the example of FIG. 13, the icon IC81 on which the word "OK" is written is displayed in the GUI switch display area A82. The display controller 350 causes the display of the image IM8 to end when selection of the icon IC81 has been received by the input 320.

The HMI controller 180 may perform control for generating sound information corresponding to details displayed in the information display areas A11 to A81 and causing the generated sound information to be output from the terminal device 300 instead of (or in addition to) the control for causing the terminal device 300 to display the images IM1 to IM8 described above.

[Process Flow]

Figure 14:
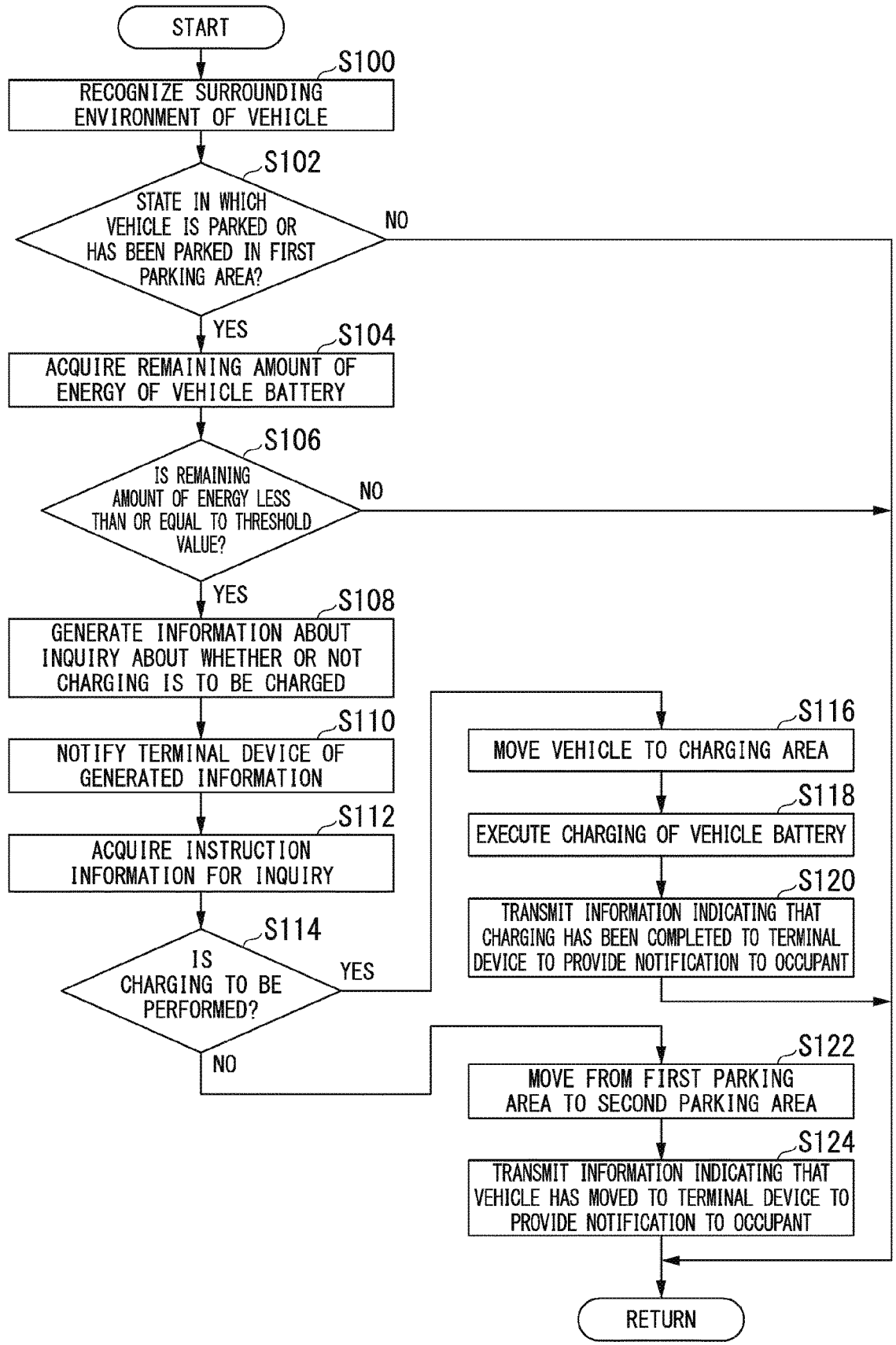
FIG. 14 is a flowchart showing an example of a flow of a process to be executed by an automated driving control device.

FIG. 14 is a flowchart showing an example of a flow of a process to be executed by the automated driving control device 100. Hereinafter, a process during the execution of entry into the first parking area PA1 or after entry into the first parking area PA1 in unmanned traveling is assumed to be described. For example, the process of the present flowchart may be iteratively executed at a prescribed cycle or a prescribed timing.

First, the recognizer 130 recognizes a surrounding environment of the vehicle M (step S100). Next, the recognizer 130 determines whether or not the vehicle M is parked or has been parked in the first parking area PA1 on the basis of the recognized surrounding environment (step S102). When it is determined that the vehicle M is parked or has been parked in the first parking area PA1, the remaining amount manager 170 acquires the remaining amount of energy of the vehicle battery 250 (step S104) and determines whether or not the acquired remaining amount of energy is less than or equal to a threshold value (step S106).

When it is determined that the remaining amount of energy is less than or equal to the threshold value, the HMI controller 180 generates information about an inquiry about whether or not the vehicle battery 250 is charged (step S108) and causes a notification of the generated information to be provided to the terminal device 300 (step S110). Next, the HMI controller 180 acquires instruction information for the inquiry transmitted by the terminal device 300 (step S112). Next, the remaining amount manager 170 determines whether or not the vehicle battery 250 is to be charged on the basis of the acquired instruction information (step S114). When it is determined that the vehicle battery 250 is to be charged, the first controller 120 and the second controller 160 cause the vehicle M to move to the charging area CA according to automated driving (step S116). Next, the remaining amount manager 170 executes charging of the vehicle battery 250 (step S118). Next, the HMI controller 180 transmits information indicating that the charging has been completed to the terminal device 300 to provide a notification to the occupant (step S120).

When it is determined that the vehicle battery 250 is not to be charged in the processing of step S114, the first controller 120 and the second controller 160 causes the vehicle to move from the first parking area PA1 to the second parking area PA2 (step S122). Next, the HMI controller 180 transmits information indicating that the vehicle M has moved to the terminal device 300 to provide a notification to the occupant U (step S124). Thereby, the process of the present flowchart ends. When it is determined that the vehicle is not parked or has not been in the first parking area PA1 in the processing of step S102 or when it is determined that the remaining amount of energy is not less than or equal to the threshold value in the processing of step S106, the process of the present flowchart ends.

In the present embodiment, when the remaining amount of energy is less than or equal to the threshold value in the processing of step S106 in the flowchart described above, the processing of steps S122 and S124 may be executed without performing the processing related to charging in steps S108 to S120. In the process of the flowchart described above, when the vehicle battery 250 is charged according to the non-contact scheme, the automated driving control device 100 may perform control for moving the vehicle M after charging from the charging area CA to the first parking area. When charging of the vehicle battery 250 is performed according to the contact scheme, the automated driving control device 100 may provide a notification of information about a request for returning the occupant U to the vehicle M in order to attach and detach the charging connector 254.

According to the above-described embodiment, there are provided the recognizer 130 configured to recognize a surrounding environment of the vehicle M; a driving controller (the first controller 120 and the second controller 160) configured to perform driving control based on speed control and steering control of the vehicle M independently of an operation of the occupant U on the basis of a recognition result of the recognizer 130; and the remaining amount manager (an example of an acquirer) 170 configured to acquire the remaining amount of energy of the vehicle M, wherein the driving controller causes the vehicle M to move from the first parking area PA1 to the second parking area PA2 where parking is possible according to traveling based on the driving control and traveling based on manual driving of the occupant of the vehicle M in a state in which the vehicle is parked or has been parked in the first parking area PA1 where the vehicle M is parked according to the traveling based on the driving control and when the remaining amount of energy acquired by the remaining amount manager 170 is less than or equal to a threshold value, so that more appropriate self-traveling parking can be executed.

Modified Examples

In the above-described embodiment, instead of (or in addition to) the remaining amount of battery power of the vehicle battery 250, driving control may be performed using the remaining amount of fuel of the vehicle M (for example, the remaining amount of gasoline) as the remaining amount of energy.

In the above-described embodiment, the remaining amount manager 170 may determine whether or not the remaining amount of energy of the vehicle battery 250 is less than or equal to the threshold value at a timing when the occupant U has got into the vehicle or in front of a point where the self-traveling parking event is predicted to start (in other words, in a state in which the occupant U has not yet got out of the vehicle M) instead of a state in which the vehicle M is parked or has been parked in the first parking area PA1 according to the self-traveling parking event. In this case, when it is determined that the remaining amount of energy is less than or equal to the threshold value, the HMI controller 180 generates information indicating that the vehicle M cannot be parked in the first parking area PA1 due to a lack of energy and causes the generated information to be output to the terminal device 300 or the HMI 30. Thereby, the occupant U can cause the vehicle battery 250 to be charged in the charging area before an entering instruction based on self-traveling parking is issued, cause the vehicle M to generate a power generation plan, cause power generation and charging based on the generated power generation plan to be executed, or park the vehicle M in the second parking area PA2 in manual driving.

[Hardware Configuration]

Figure 15:
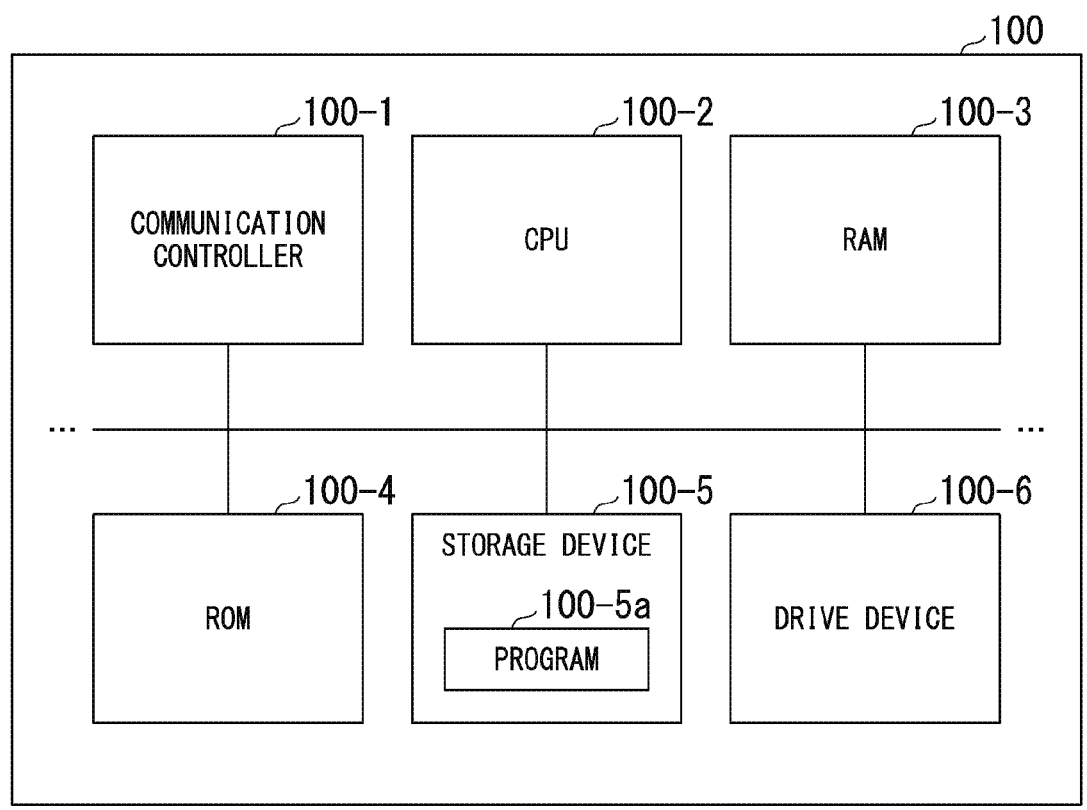
FIG. 15 is a diagram showing an example of a hardware configuration of the automated driving control device according to the embodiment.

FIG. 15 is a diagram showing an example of a hardware configuration of the automated driving control device 100 of the embodiment. As shown in FIG. 15, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or a hard disk drive (HDD), a drive device 100-6, and the like are mutually connected by an internal bus or a dedicated communication line. The communication controller 100-1 communicates with components other than the automated driving control device 100. A program 100-5a executed by the CPU 100-2 is stored in the storage device 100-5. A portable storage medium such as an optical disk (for example, a computer-readable non-transitory storage medium) is attached to the drive device 100-6. The storage device 100-5 stores the program 100-5a to be executed by the CPU 100-2. This program is loaded to the RAM 100-3 by a direct memory access (DMA) controller (not shown) or the like and executed by the CPU 100-2. The program 100-5a to be referred to by the CPU 100-2 may be stored in the portable storage medium attached to the drive device 100-6 or may be downloaded from another device via a network. Thereby, some or all of the first controller 120, the second controller 160, the remaining amount manager 170, and the HMI controller 180 are implemented.

The embodiment described above can be represented as follows.

A vehicle control device including:
a storage device configured to store a program; and
a hardware processor,
wherein the hardware processor executes the program stored in the storage device to:
recognize a surrounding environment of a vehicle;
perform driving control based on speed control and steering control of the vehicle independently of an operation of an occupant of the vehicle on the basis of a recognition result;
acquire the remaining amount of energy of the vehicle; and
cause the vehicle to move from a first parking area to a second parking area where parking is possible according to traveling based on the driving control and traveling based on manual driving of the occupant of the vehicle in a state in which the vehicle is parked or has been parked in the first parking area where the vehicle is parked according to the traveling based on the driving control and when the acquired remaining amount of energy is less than or equal to a threshold value.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a recognizer configured to recognize a surrounding environment of a vehicle;
a driving controller configured to perform driving control based on speed control and steering control of the vehicle on a basis of a recognition result of the recognizer;
an acquirer configured to acquire the remaining amount of energy of the vehicle, wherein the driving controller causes the vehicle to move from a first parking area to a second parking area where parking is possible according to traveling based on the driving control and traveling based on manual driving in a state in which the vehicle is parked or has been parked in the first parking area where the vehicle is parked according to the traveling based on the driving control and when the remaining amount of energy acquired by the acquirer is less than or equal to a threshold value;
a communicator configured to communicate with a terminal device;
a notification controller configured to cause the communicator to notify the terminal device of the occupant of the vehicle that the remaining amount of energy is less than or equal to the threshold value when movement of the vehicle from the first parking area to the second parking area according to the traveling based on the driving control has been completed; and
energy storage device configured to supply energy for travel driving of the vehicle, wherein the acquirer acquires the remaining amount of energy of the energy storage device, wherein the notification controller inquires of the terminal device about whether to supply the energy to the energy storage device in a supply area when the remaining amount of energy is less than or equal to the threshold value and there is a supply area where the supply of the energy for the energy storage device is possible in an area other than the first parking area in the state in which the vehicle is parked or has been parked in the first parking area, and wherein the driving controller causes the vehicle to move to the supply area when an instruction for supplying the energy for the energy storage device has been received from the terminal device.

2. The vehicle control device according to claim 1, wherein the driving controller causes the vehicle to move from the supply area to the first parking area after the supply is completed when the energy is supplied to the energy storage device in a non-contact scheme in the supply area.

3. The vehicle control device according to claim 1, wherein the notification controller causes the communicator to notify the terminal device of information about a request for allowing the occupant to move to a position of the vehicle when the energy is supplied to the energy storage device in a contact scheme in the supply area.

4. The vehicle control device according to claim 3, wherein the driving controller causes the vehicle to move from the supply area to the second parking area when the supply of the energy for the energy storage device has not started even when a period of time from the arrival of the vehicle at the supply area or a period of time from the notification of the information about the request to the terminal device exceeds a time limit.

5. A vehicle control method comprising:
recognizing, by a computer, a surrounding environment of a vehicle; performing, by the computer, driving control based on speed control and steering control of the vehicle on a basis of a recognition result;
acquiring, by the computer, a remaining amount of energy of the vehicle;
causing, by the computer, the vehicle to move from a first parking area to a second parking area where parking is possible according to traveling based on the driving control and traveling based on manual driving in a state in which the vehicle is parked or has been parked in the first parking area where the vehicle is parked according to the traveling based on the driving control and when the acquired remaining amount of energy is less than or equal to a threshold value;
establishing, by the computer, communication with a terminal device;
notifying, by the computer, the terminal device of the occupant of the vehicle that the remaining amount of energy is less than or equal to a threshold value when movement of the vehicle from the first parking area to the second parking area according to the traveling based on the driving control has been completed;
supplying, by the computer, energy for the vehicle to travel by driving of the vehicle;
acquiring, by the computer, the remaining amount of energy of an energy storage device;
inquiring, by the computer, the terminal device about whether to supply the energy to the energy storage device in a supply area when the remaining amount of energy is less than or equal to the threshold value and there is a supply area where the supply of the energy for the energy storage device is possible in an area other than the first parking area in the state in which the vehicle is parked or has been parked in the first parking area; and causing, by the computer, the vehicle to move to the supply area when an instruction for supplying the energy for the energy storage device has been received from the terminal device.

6. A computer-readable non-transitory storage medium storing a program for causing a computer to:

recognize a surrounding environment of a vehicle;

perform driving control based on speed control and steering control of the vehicle on a basis of a recognition result;

acquire a remaining amount of energy of the vehicle;

cause the vehicle to move from a first parking area to a second parking area where parking is possible according to traveling based on the driving control and traveling based on manual driving in a state in which the vehicle is parked or has been parked in the first parking area where the vehicle is parked according to the traveling based on the driving control and when the acquired remaining amount of energy is less than or equal to a threshold value;

communicate with a terminal device;

cause the communicator to notify the terminal device of the occupant of the vehicle that the remaining amount of energy is less than or equal to a threshold value when movement of the vehicle from the first parking area to the second parking area is completed;

supply energy for travel driving of the vehicle;

inquire of the terminal device about whether to supply the energy to an energy storage device in a supply area when the remaining amount of energy is less than or equal to the threshold value and there is a supply area where the supply of the energy for the energy storage device is possible in an area other than the first parking area in the state in which the vehicle is parked or has been parked in the first parking area; and cause the vehicle to move to the supply area when an instruction for supplying the energy for the energy storage device has been received from the terminal device.

* * * * *